US012637574B2

(12) United States Patent
Konishi

(10) Patent No.: US 12,637,574 B2
(45) Date of Patent: May 26, 2026

(54) COATING COMPOSITION

(71) Applicant: KANSAI PAINT CO., LTD., Hyogo (JP)

(72) Inventor: Kazushi Konishi, Tochigi (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 18/710,062

(22) PCT Filed: Jun. 16, 2022

(86) PCT No.: PCT/JP2022/024202
§ 371 (c)(1),
(2) Date: May 14, 2024

(87) PCT Pub. No.: WO2023/089856
PCT Pub. Date: May 25, 2023

(65) Prior Publication Data
US 2025/0026942 A1 Jan. 23, 2025

(30) Foreign Application Priority Data
Nov. 18, 2021 (JP) ................................. 2021-187454

(51) Int. Cl.
| | |
|---|---|
| *C09D 7/40* | (2018.01) |
| *C09D 7/62* | (2018.01) |
| *C09D 7/65* | (2018.01) |
| *C09D 133/08* | (2006.01) |

(52) U.S. Cl.
CPC ................. C09D 7/70 (2018.01); C09D 7/62 (2018.01); C09D 7/65 (2018.01); C09D 133/08 (2013.01)

(58) Field of Classification Search
CPC ... C09D 7/70; C09D 7/65; C09D 7/62; C09D 133/08
See application file for complete search history.

(56) References Cited

U.S. PATENT DOCUMENTS

| | | |
|---|---|---|
| 2020/0238333 A1 | 7/2020 | Itoh et al. |
| 2021/0371681 A1* | 12/2021 | Omura ................... C08K 3/013 |
| 2022/0348773 A1 | 11/2022 | Sakai et al. |
| 2022/0403204 A1 | 12/2022 | Sakai et al. |

FOREIGN PATENT DOCUMENTS

| | | | |
|---|---|---|---|
| JP | 2013-221041 | 10/2013 | |
| JP | 2019-123827 | 7/2019 | |
| JP | 2020-147611 | 9/2020 | |
| JP | 2021-41397 | 3/2021 | |
| TW | 202106817 | 2/2021 | |
| WO | 2017/175468 | 10/2017 | |
| WO | WO-2019131957 A1 * | 7/2019 | .......... C09D 133/08 |
| WO | 2021/002196 | 1/2021 | |
| WO | 2021/095760 | 5/2021 | |

OTHER PUBLICATIONS

International Search Report issued Sep. 6, 2022 in International (PCT) Application No. PCT/JP2022/024202.
Extended European Search Report dated Feb. 20, 2026 in European Application No. 22895145.5.

* cited by examiner

*Primary Examiner* — Robert S Walters, Jr.
(74) *Attorney, Agent, or Firm* — Wenderoth, Lind & Ponack, L.L.P.

(57) ABSTRACT

Provided is a coating composition containing a hydroxyl group-containing resin (A), a curing agent (B), a scale-shaped effect pigment (C), a viscosity modifier (D), and an organic solvent (E) having a solubility in water at 20° C. of 4 mass % or greater. The viscosity modifier (D) contains at least one viscosity modifier selected from the group consisting of a cellulose nanocrystal (D1) and a cellulose nanofiber (D2). A content of the organic solvent (E) having a solubility in water at 20° C. of 4 mass % or greater is in a range of 10 to 25 mass % based on a content of a volatile component in the coating composition.

7 Claims, No Drawings

COATING COMPOSITION

TECHNICAL FIELD

The present invention relates to a coating composition.

BACKGROUND ART

In a widely employed method for forming a multilayer coating film for an automobile body or an automobile component in the related art, a multilayer coating film is formed by a three-coating two-baking scheme. In the three-coating two-baking scheme, an object to be coated (e.g., electrodeposition-coated steel sheet, plastic) is successively subjected to application of intermediate coating material, heating and curing, application of basecoat coating material, application of clear coating material, and heating and curing.

Meanwhile, in recent years, from the viewpoints of reduction in line processes and energy conservation, a three-coating one-baking scheme and a two-coating one-baking scheme have been studied. In the three-coating one-baking scheme, the heating and curing process after the intermediate coating material application process is omitted, and application of intermediate coating material, application of basecoat coating material, application of clear coating material, and heating and curing are successively performed. In the two-coating one-baking scheme, the intermediate coating material application process is omitted, and application of basecoat coating material, application of clear coating material, and heating and curing are successively performed (a preheating (preliminary heating) process may be included after application of the coating material). Among these, from the viewpoint of suppressing environmental pollution due to volatilization of an organic solvent, a three-coating one-baking scheme and a two-coating one-baking scheme that use aqueous coating material as a base coating material have been particularly demanded.

For coating of an outer panel of an automobile, even the three-coating one-baking scheme has been demanded to provide design that gives a sense of high quality to a level achieved in the related art or beyond.

In addition, unfortunately for aqueous coating material containing an effect pigment, metallic color irregularities are easily caused compared to an organic solvent-type coating material.

Meanwhile, because application becomes difficult when thickening and/or precipitation occur during storage of a coating material, the coating material is required to have storage stability.

An example of a means to control a viscosity of the aqueous basecoat coating material includes a method of blending an associative viscosity modifier in a coating material. The associative viscosity modifier typically has a hydrophilic portion and a hydrophobic portion per molecule. The hydrophilic portion contributes to stability in an aqueous solution. The hydrophobic portion adsorbs onto a surface of a pigment and/or resin particle in an aqueous coating material or the hydrophobic portions are associated with each other to form a network structure in an aqueous coating material. And thus thickening action is effectively exhibited.

The associative viscosity modifier typically forms a network structure by hydrophobic interaction and exhibits viscosity.

Typically, the aqueous basecoat coating material may contain a surfactant to disperse a hydrophobic resin component in water. Furthermore, in a case where a water-soluble resin, an additive, or a pigment dispersion paste is contained, a contained hydrophilic organic solvent may be brought into the aqueous coating material.

However, in a case where an associative viscosity modifier is used in the aqueous basecoat coating material containing a surfactant and/or a hydrophilic organic solvent, viscosity is less likely to be exhibited by the associative viscosity modifier, and irregularities and the like may occur, becoming issues. Specifically, in a case where the viscosity is low at the time when an aqueous base coating material is applied onto an object to be coated, a mixed layer is formed in between a coating material applied on an upper layer and/or a coating material applied on to a bottom layer, and in a case where the aqueous coating material contains an effect pigment, the effect pigment changes position in the coating material after application of the coating material, thus orientation of the effect pigment becomes irregular, and irregularities may occur.

An aqueous coating composition disclosed in Patent Document 1 is introduced to achieve high exhibition of viscosity and viscosity characteristics, in which a viscosity decreases as a shear rate increases. This aqueous coating composition contains acrylic resin particles (A), a hydroxyl group-containing resin (B), a crosslinking agent (C), a viscosity modifier (D), and a pigment (E). The acrylic resin particles (A) have a core-shell structure with a mass ratio of 10/90 to 90/10. The core part is crosslinked. An amount of a polymerizable unsaturated monomer (al) having a linear, branched, or cyclic saturated or unsaturated hydrocarbon group having 4 or more carbons is from 3 to 70 parts by mass based on 100 parts by mass total of polymerizable unsaturated monomers constituting the acrylic resin particles (A). The hydroxyl group-containing resin (B) has a weight average molecular weight of 1000 or greater and less than 100000. The viscosity modifier (D) has a weight average molecular weight of 100000 or greater and contains, based on 100 parts by mass total of all monomers contained, from 5 to 50 parts by mass of a polymerizable unsaturated monomer (d1) having a polyoxyalkylene chain, from 5 to 90 parts by mass of a hydrophilic functional group-containing polymerizable unsaturated monomer (d2) having no polyoxyalkylene chain, and from 5 to 90 parts by mass of an additional polymerizable unsaturated monomer (d3). The hydrophilic functional group-containing polymerizable unsaturated monomer (d2) having no polyoxyalkylene chain is at least one selected from the group consisting of N-vinyl-2-pyrrolidone, N-substituted-(meth)acrylamide, a hydroxyl group-containing polymerizable unsaturated monomer, and an acid group-containing polymerizable unsaturated monomer.

CITATION LIST

Patent Literature

Patent Document 1: JP 2013-221041 A

SUMMARY OF INVENTION

Technical Problem

With the technology described in Patent Document 1, it may be difficult to provide storage stability of the resulting coating composition and suppression of metallic color irregularities of the coating film to be formed in a compatible manner. Particularly in a case where a hydrophilic solvent is contained in an aqueous coating composition, adequate viscosity cannot be achieved and it may be difficult to provide storage stability of the resulting coating composition and suppression of metallic color irregularities in the coating film to be formed in a compatible manner.

An object of the present invention is to provide a coating composition that can form a multilayer coating film having excellent storage stability and excellent appearance in which metallic color irregularities are suppressed.

Solution to Problem

As a result of diligent research to solve the issues described above, the inventor of the present invention found that the issue described above can be solved by using a coating composition containing a hydroxyl group-containing resin (A), a curing agent (B), a scale-shaped effect pigment (C), a viscosity modifier (D), and an organic solvent (E) having a solubility in water at 20° C. of 4 mass % or greater. The viscosity modifier (D) contains at least one viscosity modifier selected from the group consisting of a cellulose nanocrystal (D1) and a cellulose nanofiber (D2). A content of the organic solvent (E) having a solubility in water at 20° C. of 4 mass % or greater is in a range from 10 to 25 mass % based on a content of a volatile component in the coating composition.

That is, the present invention relates to the following <1> to <7>.

<1> A coating composition containing:
a hydroxyl group-containing resin (A);
a curing agent (B);
a scale-shaped effect pigment (C);
a viscosity modifier (D); and
an organic solvent (E) having a solubility in water at 20° C. of 4 mass % or greater,
where
the viscosity modifier (D) contains at least one viscosity modifier selected from the group consisting of a cellulose nanocrystal (D1) and a cellulose nanofiber (D2), and
a content of the organic solvent (E) having a solubility in water at 20° C. of 4 mass % or greater is in a range from 10 to 25 mass % based on a content of a volatile component in the coating composition.
<2> The coating composition according to <1>, where the scale-shaped effect pigment (C) contains a silica-coated scale-shaped aluminum pigment (C11).
<3> The coating composition according to <1> or <2>, where the viscosity modifier (D) contains the cellulose nanocrystal (D1).
<4> The coating composition according to any one of <1> to <3>, where the organic solvent (E) having a solubility in water at 20° C. of 4 mass % or greater contains an organic solvent (E1) having a solubility in water at 20° C. in a range from 4 to 10 mass %.
<5> The coating composition according to any one of <1> to <4>, further containing water.
<6> A method for forming a multilayer coating film, the method including:
(I-1) applying a basecoat coating composition (Y) onto an object to be coated to form an uncured basecoat film;
(I-2) applying a clearcoat coating composition (Z) onto the uncured basecoat film to form an uncured clearcoat film; and
(I-3) heating the uncured basecoat film and the uncured clearcoat film to simultaneously cure the uncured basecoat film and the uncured clearcoat film.
where the basecoat coating composition (Y) is the coating composition according to any one of <1> to <5>.

<7> A method for forming a multilayer coating film, the method including:
(II-1) applying a colored coating composition (X) onto an object to be coated to form an uncured colored coating film;
(II-2) applying a basecoat coating composition (Y) onto the uncured colored coating film to form an uncured basecoat film;
(II-3) applying a clearcoat coating composition (Z) onto the uncured basecoat film to form an uncured clearcoat film; and
(II-4) heating the uncured colored coating film, the uncured basecoat film, and the uncured clearcoat film to simultaneously cure the uncured colored coating film, the uncured basecoat film, and the uncured clearcoat film,
where the basecoat coating composition (Y) is the coating composition according to any one of <1> to <5>.

Advantageous Effects of Invention

The present invention can provide a coating composition that can form a multilayer coating film having excellent storage stability and excellent appearance in which metallic color irregularities are suppressed.

DESCRIPTION OF EMBODIMENTS

In the present specification, a singular form (e.g., a, an, the) is to be construed to cover both the singular and the plural, unless otherwise indicated herein or clearly contradicted by context.

The present invention is described in detail below through embodiments, but these embodiments are merely examples of preferred embodiments, and the present invention is not limited by the content of these embodiments.

The coating composition of an embodiment of the present invention is a coating composition containing:
a hydroxyl group-containing resin (A);
a curing agent (B);
a scale-shaped effect pigment (C);
a viscosity modifier (D); and
an organic solvent (E) having a solubility in water at 20° C. of 4 mass % or greater. The viscosity modifier (D) contains at least one viscosity modifier selected from the group consisting of a cellulose nanocrystal (D1) and a cellulose nanofiber (D2). A content of the organic solvent (E) having a solubility in water at 20° C. of 4 mass % or greater is in a range from 10 to 25 mass % based on a content of a volatile component in the coating composition.

Hydroxyl Group-Containing Resin (A)

The hydroxyl group-containing resin (A) is a resin having at least one hydroxyl group per molecule. Examples of the hydroxyl group-containing resin (A) include a resin, such as a hydroxyl group-containing acrylic resin (A1), a hydroxyl group-containing polyester resin (A2), a hydroxyl group-containing polyurethane resin (A3), a hydroxyl group-containing acryl-modified polyester resin, a hydroxyl group-containing polyether resin, a hydroxyl group-containing polycarbonate resin, a hydroxyl group-containing epoxy resin, and a hydroxyl group-containing alkyd resin. These resins can each be used alone, or two or more types of these resins can be combined and used.

The hydroxyl value of the hydroxyl group-containing resin (A) is preferably in a range from 1 to 200 mg KOH/g, more preferably in a range from 2 to 180 mg KOH/g, and particularly preferably in a range from 5 to 170 mg KOH/g, from the viewpoints of storage stability of the resulting coating composition, suppression of metallic color irregularities of the coating film to be formed, and the like.

The content of the hydroxyl group-containing resin (A) in the coating composition of an embodiment of the present invention is preferably from 20 to 90 mass %, more preferably from 25 to 87 mass %, and particularly preferably from 30 to 85 mass %, based on resin solid content in the coating composition from the viewpoints of storage stability, popping resistance, and the like of the resulting coating composition.

Note that in the present specification, the "solid content" refers to nonvolatile components such as a resin, a curing agent, and a pigment remaining after drying at 110° C. for 1 hour. The solid content can be determined, for example, by weighing a sample in a heat-resistant container such as an aluminum foil cup, spreading the sample on the bottom surface of the container, then drying the sample at 110° C. for 1 hour, and weighing the mass of the components remaining after drying.

In addition, in the present specification, the "solid content concentration" refers to a content mass ratio of the solid content in a composition. Thus, the solid content concentration of the composition can be calculated, for example, by weighing the composition into a heat-resistant container such as an aluminum foil cup, spreading the composition on the bottom surface of the container, then drying the composition at 110° C. for 1 hour, weighing the mass of the components in the composition remaining after drying, and determining a ratio of the mass of the components remaining after drying to the total mass of the composition before drying.

The hydroxyl group-containing resin (A) preferably contains a hydroxyl group-containing acrylic resin (A1) from the viewpoints of storage stability of the resulting coating composition, suppression of metallic color irregularities of the coating film to be formed, and the like.

Furthermore, as the hydroxyl group-containing resin (A), a hydroxyl group-containing polyester resin (A2) is preferably contained from the viewpoints of popping resistance of the resulting coating composition, appearance of the coating film to be formed, and the like.

Furthermore, as the hydroxyl group-containing resin (A), a hydroxyl group-containing polyurethane resin (A3) is preferably contained from the viewpoint of chipping resistance and the like of the resulting coating composition.

Hydroxyl Group-Containing Acrylic Resin (a 1)

The hydroxyl group-containing acrylic resin (A1) can typically be produced by copolymerizing a hydroxyl group-containing polymerizable unsaturated monomer (a) and an additional polymerizable unsaturated monomer (b) that is copolymerizable with the hydroxyl group-containing polymerizable unsaturated monomer (a) by a method known per se, such as a solution polymerization method in an organic solvent or an emulsion polymerization method in an aqueous medium.

The hydroxyl group-containing polymerizable unsaturated monomer (a) is a compound having at least one hydroxyl group and at least one polymerizable unsaturated group per molecule, and examples thereof include monoesterified products of a dihydric alcohol having from 2 to 8 carbons and a (meth)acrylic acid, such as 2-hydroxyethyl (meth)acrylate, 2-hydroxypropyl (meth)acrylate, 3-hydroxypropyl (meth)acrylate, and 4-hydroxybutyl (meth) acrylate; ε-caprolactone modified products of these monoesterified products; N-hydroxymethyl (meth)acrylamides;

allyl alcohols; and (meth)acrylates having a polyoxyethylene chain having a hydroxyl group at a molecular terminal.

However, in an embodiment of the present invention, the monomer corresponding to (xvii) a polymerizable unsaturated monomer having a UV absorbing functional group described below should be defined as an additional polymerizable unsaturated monomer (b) that can be copolymerized with the hydroxyl group-containing polymerizable unsaturated monomer (a) and is excluded from the hydroxyl group-containing polymerizable unsaturated monomer (a). One type of hydroxyl group-containing polymerizable unsaturated monomer (a) can be used alone or two or more types may be combined and used.

Note that, in the present specification, a polymerizable unsaturated group means an unsaturated group that is radically polymerizable. Examples of such polymerizable unsaturated groups include a vinyl group, a (meth)acryloyl group, a (meth)acrylamide group, a vinyl ether group, an allyl group, a propenyl group, an isopropenyl group, and a maleimide group.

Note that in the present specification, "(meth)acrylate" means an acrylate or a methacrylate, and "(meth)acrylic acid" means acrylic acid or methacrylic acid. Also, "(meth) acryloyl" means acryloyl or methacryloyl. Furthermore, "(meth)acrylamide" means acrylamide or methacrylamide.

The additional polymerizable unsaturated monomer (b) that is copolymerizable with the hydroxyl group-containing polymerizable unsaturated monomer (a) can be appropriately selected and used according to the desired properties of the hydroxyl group-containing acrylic resin (A1). Specific examples of the monomer (b) include those described in (i) to (xix) below. These resins can each be used alone, or two or more types of these resins can be combined and used.

(i) Alkyl or cycloalkyl (meth)acrylates: such as methyl (meth)acrylate, ethyl (meth)acrylate, n-propyl (meth) acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, dodecyl (meth)acrylate, tridecyl (meth)acrylate, stearyl (meth) acrylate, isostearyl (meth)acrylate, cyclohexyl (meth) acrylate, methylcyclohexyl (meth)acrylate, tert-butylcyclohexyl (meth)acrylate, cyclododecyl (meth) acrylate, and tricyclodecanyl (meth)acrylate.

(ii) Polymerizable unsaturated monomers having an isobornyl group: such as isobornyl (meth)acrylate.

(iii) Polymerizable unsaturated monomers having an adamantyl group: such as adamantyl (meth)acrylate.

(iv) Polymerizable unsaturated monomers having a tricyclodecenyl group: such as tricyclodecenyl (meth)acrylate.

(v) Aromatic ring-containing polymerizable unsaturated monomers: such as benzyl (meth)acrylate, styrene, α-methylstyrene, and vinyl toluene.

(vi) Polymerizable unsaturated monomers having an alkoxysilyl groups: such as vinyl trimethoxysilane, vinyltriethoxysilane, vinyltris (2-methoxyethoxy)silane, γ-(meth)acryloyloxypropyl trimethoxysilane, and γ-(meth)acryloyloxypropyl triethoxysilane.

(vii) Polymerizable unsaturated monomers having a fluorinated alkyl group: such as perfluoroalkyl (meth)acrylates such as perfluorobutyl ethyl (meth)acrylate and perfluorooctyl ethyl (meth)acrylate; and fluoroolefins.

(viii) Polymerizable unsaturated monomers having a photopolymerizable functional group such as a maleimide group.

(ix) Vinyl compounds: such as N-vinylpyrrolidone, ethylene, butadiene, chloroprene, vinyl propionate, and vinyl acetate.

(x) Carboxyl group-containing polymerizable unsaturated monomers: such as (meth)acrylic acid, maleic acid, crotonic acid, and β-carboxyethyl acrylate.

(xi) Nitrogen-containing polymerizable unsaturated monomers: such as (meth)acrylonitrile, (meth)acrylamide. N,N-dimethylaminoethyl (meth)acrylate, N,N-diethylaminoethyl (meth)acrylate, N,N-dimethylaminopropyl (meth)acrylamide, methylene bis(meth) acrylamide, ethylene bis(meth)acrylamide, 2-(methacryloyloxy) ethyltrimethyl ammonium chloride, and adducts of glycidyl (meth)acrylate and an amine compound.

(xii) Polymerizable unsaturated monomers having two or more polymerizable unsaturated groups per molecule: such as allyl (meth)acrylate, ethylene glycol di(meth) acrylate, 1,4-butanediol di(meth)acrylate, neopentyl glycol di(meth)acrylate, and 1,6-hexanediol di(meth) acrylate.

(xiii) Epoxy group-containing polymerizable unsaturated monomers: such as glycidyl (meth)acrylate, β-methylglycidyl (meth)acrylate, 3,4-epoxycyclohexyl methyl (meth)acrylate, 3,4-epoxycyclohexyl ethyl(meth)acrylate, 3,4-epoxycyclohexylpropyl (meth)acrylate, and allyl glycidyl ether.

(xiv) (Meth)acrylates having a polyoxyethylene chain with an alkoxy group at the molecular terminal.

(xv) Polymerizable unsaturated monomers having a sulfonic acid group: such as 2-acrylamido-2-methylpropane sulfonic acid, 2-sulfoethyl (meth)acrylate, allyl sulfonic acid, 4-styrene sulfonic acid, and the like, and sodium salts and ammonium salts of these sulfonic acids.

(xvi) Polymerizable unsaturated monomers having a phosphate group: such as acid phosphoethyl (meth) acrylate, acid phosphopropyl (meth)acrylate, acid phosphoxypoly(oxyethylene)glycol (meth)acrylate, and acid phosphoxypoly(oxypropylene)glycol (meth) acrylate.

(xvii) Polymerizable unsaturated monomers having a UV-absorbing functional group; such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole.

(xviii) Photostable polymerizable unsaturated monomers: such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth) acryloylamino-2,2,6,6-tetramethylpiperidine, 1-(meth) acryloyl-4-cyano-4-(meth)acryloylamino-2,2,6,6-tetramethylpiperidine, 4-crotonoyloxy-2,2,6,6-tetramethylpiperidine, 4-crotonylamino-2,2,6,6-tetramethylpiperidine, and 1-crotonoyl-4-crotonoyloxy-2,2,6,6-tetramethylpiperidine.

(xix) Polymerizable unsaturated monomers having a carbonyl group: such as acrolein, diacetone acrylamide, diacetone methacrylamide, acetoacetoxy ethyl methacrylate, formylstyrol, and vinyl alkyl ketones having from 4 to 7 carbons (for example, vinyl methyl ketone, vinyl ethyl ketone, vinyl butyl ketone).

The hydroxyl group-containing acrylic resin (A1) can also be used in combination with a so-called urethane-modified acrylic resin, which is elongated and increased in molecular weight by causing a polyisocyanate compound to undergo a urethanization reaction with some of the hydroxyl groups in the resin.

The hydroxyl group-containing polymerizable unsaturated monomer (a) can generally be used at an amount in a range from 1 to 50 mass %, preferably 2 to 40 mass %, and more preferably 3 to 30 mass %, based on the total amount of the hydroxyl group-containing polymerizable unsaturated monomer (a) and the additional polymerizable unsaturated monomer (b) that is copolymerizable.

The hydroxyl value of the hydroxyl group-containing acrylic resin (A1) is preferably in a range from 1 to 200 mg KOH/g, more preferably in a range from 2 to 150 mg KOH/g, and particularly preferably in a range from 5 to 100 mg KOH/g, from the viewpoint of storage stability and the like of the resulting coating composition.

Furthermore, the acid value of the hydroxyl group-containing acrylic resin (A1) is preferably in a range from 1 to 200 mg KOH/g, more preferably in a range from 2 to 150 mg KOH/g, and particularly preferably in a range from 5 to 80 mg KOH/g, from the viewpoints of storage stability of the resulting coating composition, suppression of metallic color irregularities of the coating film to be formed, and the like.

Furthermore, from the viewpoint of storage stability and the like of the resulting coating composition, the weight average molecular weight of the hydroxyl group-containing acrylic resin (A1) is preferably in a range from 2000 to 5000000, more preferably in a range from 4000 to 1000000, and particularly preferably in a range from 8000 to 500000.

Note that, in the present specification, the number average molecular weight and the weight average molecular weight are values calculated by converting a retention time (retention capacity) measured using gel permeation chromatograph (GPC) into a molecular weight of polystyrene using a retention time (retention capacity) of standard polystyrene having a known molecular weight measured under the same conditions. Specifically, the measurement can be performed using, as the gel permeation chromatograph, using "HLC8120GPC" (trade name, available from Tosoh Corporation), using four columns "TSKgel G-4000HXL", "TSKgel G-3000HXL", "TSKgel G-2500HXL", and "TSKgel G-2000HXL" (trade names, all available from Tosoh Corporation), and using a differential refractometer as a detector, under conditions of tetrahydrofuran as a mobile phase at a measurement temperature of 40° C. and a flow rate of 1 mL/min.

In a case where the coating composition of an embodiment of the present invention is an aqueous coating material, from the viewpoints of storage stability and popping resistance and the like of the resulting coating composition, the hydroxyl group-containing acrylic resin (A1) preferably contains a water-dispersible hydroxyl group-containing acrylic resin (A11) having a core/shell multi-layer structure (hereinafter, also abbreviated as "water-dispersible hydroxyl group-containing acrylic resin (A11)"). The core/shell multi-layer structure contains, as components, a core made of a copolymer (I) and a shell made of a copolymer (II). The copolymer (I) is formed by copolymerization of a polymerizable unsaturated monomer (c) having at least 2 polymerizable unsaturated groups per molecule and a polymerizable unsaturated monomer (d) having one polymerizable unsaturated group per molecule. The copolymer (II) is formed by copolymerization of the hydroxyl group-containing polymerizable unsaturated monomer (a) and a polymerizable unsaturated monomer (b) other than the hydroxyl group-containing polymerizable unsaturated monomer (a).

Examples of the polymerizable unsaturated monomer (c) having at least two polymerizable unsaturated groups per molecule, which constitutes the core, include allyl (meth) acrylate, ethylene glycol di(meth)acrylate, triethylene glycol di(meth)acrylate, tetraethylene glycol di(meth)acrylate, 1,3-butylene glycol di(meth)acrylate, trimethylolpropane tri (meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth) acrylate, glycerol di(meth)acrylate, 1,1,1-tris(hydroxym-ethyl)ethane di(meth)acrylate, 1,1,1-tris(hydroxymethyl) ethane tri(meth)acrylate, 1,1,1-tris(hydroxymethyl)propane tri(meth)acrylate, triallylisocyanurate, diallyltetraphthalate, and divinylbenzene. Each of these can be used alone, or two or more types can be combined and used.

The polymerizable unsaturated monomer (c) having at least two polymerizable unsaturated groups per molecule can generally be used at an amount in a range from 0.1 to 30 mass %, preferably 0.1 to 10 mass %, and even more preferably 0.1 to 5 mass %, based on the total mass of the monomer (c) and monomer (d).

Furthermore, the polymerizable unsaturated monomer (d) having one polymerizable unsaturated group per molecule, which constitutes the core, is a polymerizable unsaturated monomer that is copolymerizable with the polymerizable unsaturated monomer (c) having at least two polymerizable unsaturated groups per molecule, and includes compounds containing one polymerizable unsaturated group, such as a vinyl group, a (meth)acryloyl group, and an allyl group, per molecule.

Specific examples of the polymerizable unsaturated monomer (d) having one polymerizable unsaturated group per molecule include alkyl or cycloalkyl (meth)acrylates, such as methyl (meth)acrylate, ethyl (meth)acrylate, n-pro-pyl (meth)acrylate, isopropyl (meth)acrylate, n-butyl (meth) acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acry-late, lauryl (meth)acrylate, stearyl (meth)acrylate, "isoste-aryl acrylate" (trade name, available from Osaka Organic Chemical Industry Ltd.), cyclohexyl (meth)acrylate, meth-ylcyclohexyl (meth)acrylate, tert-butyl cyclohexyl (meth) acrylate, and cyclododecyl (meth)acrylate; polymerizable unsaturated monomers having an isobornyl group, such as isobornyl (meth)acrylate: polymerizable unsaturated mono-mers having an adamantyl group, such as adamantyl (meth) acrylate; vinyl aromatic compounds, such as styrene, α-methylstyrene, and vinyl toluene; hydroxyl group-con-taining polymerizable unsaturated monomers, such as monoesterified products of a dihydric alcohol having from 2 to 8 carbons and a (meth)acrylic acid, such as 2-hydroxy-ethyl (meth)acrylate, 2-hydroxypropyl (meth)acrylate, 3-hy-droxypropyl (meth)acrylate, and 4-hydroxybutyl (meth) acrylate, ε-caprolactone modified products of the monoesterified products of a dihydric alcohol having from 2 to 8 carbons and a (meth)acrylic acid, allyl alcohols, and (meth)acrylates having a polyoxyethylene chain with a hydroxyl group at a molecular terminal; carboxyl group-containing polymerizable unsaturated monomers, such as (meth)acrylic acid, maleic acid, crotonic acid, and β-car-boxyethyl acrylate; and nitrogen-containing polymerizable unsaturated monomers such as (meth)acrylonitrile, (meth) acrylamide, dimethylaminopropyl (meth)acrylamide, dim-ethylaminoethyl (meth)acrylate, and adducts of glycidyl (meth)acrylate and amine compounds. Each of these can be used alone, or two or more types can be combined and used.

On the other hand, as described above, examples of the hydroxyl group-containing polymerizable unsaturated monomer (a), which constitutes the shell, include monoes-terified products of a dihydric alcohol having from 2 to 8 carbons and (meth)acrylic acid, such as 2-hydroxyethyl (meth)acrylate, 2-hydroxypropyl (meth)acrylate, 3-hy-droxypropyl (meth)acrylate, and 4-hydroxybutyl (meth) acrylate; ε-caprolactone modified products of these monoes-terified products of a dihydric alcohol having from 2 to 8 carbons and (meth)acrylic acid: allyl alcohols; and (meth) acrylates having a polyoxyethylene chain with a hydroxyl group at a molecular terminal. Each of these can be used alone, or two or more types can be combined and used.

The hydroxyl group-containing polymerizable unsatu-rated monomer (a) can generally be used at an amount in a range from 1 to 35 mass %, preferably 2 to 25 mass %, and more preferably 3 to 20 mass %, based on the total mass of the monomer (a) and the monomer (b).

Furthermore, as the polymerizable unsaturated monomer (b) other than the hydroxyl group-containing polymerizable unsaturated monomer (a) constituting the shell, a polymer-izable unsaturated monomer (b) other than the hydroxyl group-containing polymerizable unsaturated monomer (a) can be used. These resins can each be used alone, or two or more types of these resins can be combined and used.

From the viewpoint of ensuring the smoothness of the coating film to be formed, at least a portion of the polym-erizable unsaturated monomer (b) other than the hydroxyl group-containing polymerizable unsaturated monomer (a) preferably contains a carboxyl group-containing polymeriz-able unsaturated monomer (e).

Examples of the carboxyl group-containing polymeriz-able unsaturated monomer (e) include (meth)acrylic acid, maleic acid, crotonic acid, and β-carboxyethyl acrylate, and of these, (meth)acrylic acid is suitable.

From the viewpoint of stability of the water-dispersible hydroxyl group-containing acrylic resin (A11) in an aqueous medium and the like, the carboxyl group-containing polym-erizable unsaturated monomer (e) is generally used at an amount in a range preferably from 1 to 40 mass %, particu-larly preferably from 1 to 25 mass %, and even more particularly preferably from 1 to 19 mass %, based on the total mass of the monomer (a) and the monomer (b).

The hydroxyl value of the water-dispersible hydroxyl group-containing acrylic resin (A11) is preferably in a range from 1 to 100 mg KOH/g, more preferably in a range from 2 to 90 mg KOH/g, and particularly preferably in a range from 5 to 85 mg KOH/g, from the viewpoint of storage stability and the like of the resulting coating composition.

Furthermore, the acid value of the water-dispersible hydroxyl group-containing acrylic resin (A11) is preferably in a range from 3 to 90 mg KOH/g, more preferably in a range from 4 to 70 mg KOH/g, and particularly preferably in a range from 5 to 50 mg KOH/g, from the viewpoints of storage stability of the resulting coating composition, sup-pression of metallic color irregularities of the coating film to be formed, and the like.

Furthermore, from the viewpoints of storage stability of the resulting coating composition, suppression of metallic color irregularities of the coating film to be formed, and the like, a polymerizable unsaturated monomer having only one polymerizable unsaturated group per molecule is preferably used as the monomer (a) and the monomer (b), and the shell of the water-dispersible hydroxyl group-containing acrylic resin (A11) is preferably not crosslinked.

The water-dispersible hydroxyl group-containing acrylic resin (A11) can be produced by, for example, adding a monomer mixture (II) into an emulsion and further polymerizing the contents thereof. The emulsion is produced by emulsion polymerization of a monomer mixture (I) containing from 0.1 to 30 mass % of the polymerizable unsaturated monomer (c) having at least two polymerizable unsaturated groups per molecule and 70 to 99.9 mass % of the polymerizable unsaturated monomer (d) having one polymerizable unsaturated group per molecule. The monomer mixture (II) contains from 1 to 35 mass % of the hydroxyl group-containing polymerizable unsaturated monomer (a) and from 65 to 99 mass % of the polymerizable unsaturated monomer (b) other than the monomer (a).

The emulsion polymerization of the above monomer mixture can be carried out by a known method, for example, using a polymerization initiator in the presence of an emulsifier.

As the emulsifier, anionic emulsifiers or nonionic emulsifiers are suitable. Examples of the anionic emulsifier include sodium salts and ammonium salts of organic acids such as alkyl sulfonic acid, alkylbenzene sulfonic acid, and alkylphosphoric acid. Examples of the nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, and polyoxyethylene sorbitan monolaurate.

A polyoxyalkylene group-containing anionic emulsifier having, per molecule, an anionic group and a polyoxyalkylene group such as a polyoxyethylene group or a polyoxypropylene group, or a reactive anionic emulsifier having, per molecule, the anionic group and a radically polymerizable unsaturated group may be used, and of these, use of a reactive anionic emulsifier is suitable.

Examples of the reactive anionic emulsifier include sodium salts and ammonium salts of sulfonic acid compounds having a radically polymerizable unsaturated group such as a (meth)allyl group, a (meth)acryloyl group, a propenyl group, and a butenyl group. Of these, an ammonium salt of a sulfonic acid compound having a radically polymerizable unsaturated group is preferred because of the excellent water resistance of the formed coating film. Examples of the ammonium salt of a sulfonic acid compound include commercially available products such as "Latemul S-180A" (trade name, available from Kao Corporation).

Among the ammonium salts of sulfonic acid compounds having a radically polymerizable unsaturated group, an ammonium salt of a sulfonic acid compound having a radically polymerizable unsaturated group and a polyoxyalkylene group is more preferable. Examples of ammonium salts of sulfonic acid compounds having a radically polymerizable unsaturated group and a polyoxyalkylene group include commercially available products such as "Aqualon KH-10" (trade name, available from DKS Co., Ltd.) and "SR-1025A" (trade name, available from Adeka Corporation).

The emulsifier is usually used at an amount in a range from 0.1 to 15 mass %, preferably from 0.5 to 10 mass %, and more preferably from 1 to 5 mass %, based on the total amount of all monomers that are used.

The polymerization initiator may be oil-soluble or water-soluble, and examples include organic peroxides, such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropyl carbonate, tert-butyl peroxyacetate, and diisopropyl benzene hydroperoxide; azo compounds such as azobis isobutyronitrile, azobis (2,4-dimethylvaleronitrile), azobis (2-methyl-propionitrile), azobis (2-methylbutyronitrile), 4,4'-azobis (4-cyanobutanoic acid), dimethylazobis (2-methylproprionate), azobis [2-methyl-N-(2-hydroxyethyl)-propionamide], and azobis {2-methyl-N-[2-(1-hydroxybutyl)]-propionamide}; and persulfates such as potassium persulfate, ammonium persulfate, and sodium persulfate. Each of these can be used alone, or two or more types can be combined and used.

Furthermore, optionally, a reducing agent such as a sugar, sodium formaldehyde sulfoxylate, and an iron complex may be used in combination with the polymerization initiator, and a redox polymerization system may be formed.

The polymerization initiator is ordinarily used at an amount in a range preferably from 0.1 to 5 mass %, and particularly preferably from 0.2 to 3 mass %, based on the total mass of all monomers that are used. The method of adding the polymerization initiator is not particularly limited, and can be appropriately selected according to a type, an amount, and the like of the polymerization initiator. For example, the polymerization initiator may be contained in a monomer mixture or an aqueous medium in advance, or may be added all at once or added dropwise at the time of polymerization.

The water-dispersible hydroxyl group-containing acrylic resin (A11) can be produced by adding the monomer mixture (II) containing the hydroxyl group-containing polymerizable unsaturated monomer (a) and the polymerizable unsaturated monomer (b) other than the monomer (a) to the emulsion produced as described above, and further performing polymerization.

Optionally, the monomer mixture (II) can contain, as appropriate, components such as a polymerization initiator like those listed above, a chain transfer agent, a reducing agent, and an emulsifier.

In addition, while the monomer mixture (II) can be added dropwise as is, the monomer mixture (II) is desirably dispersed in an aqueous medium and added dropwise as a monomer emulsion. The particle size of the monomer emulsion in this case is not particularly limited.

Polymerization of the monomer mixture (II) can be implemented by, for example, adding the monomer mixture (II), which may be emulsified, to the above-mentioned emulsion all at once or in a dropwise manner, and then heating to a suitable temperature while stirring.

The water-dispersible hydroxyl group-containing acrylic resin (A11) produced as described above can have a core/shell multi-layer structure including a copolymer (I) as a core and a copolymer (II) as a shell. The copolymer (I) is formed from the monomer mixture (I) containing the polymerizable unsaturated monomer (c) having at least two polymerizable unsaturated groups per molecule and the polymerizable unsaturated monomer (d) having one polymerizable unsaturated group per molecule, The copolymer (II) is formed from the monomer mixture (II) containing the hydroxyl group-containing polymerizable unsaturated monomer (a) and the polymerizable unsaturated monomer (b) other than the monomer (a).

Furthermore, the water-dispersible hydroxyl group-containing acrylic resin (A11) may be formed as resin particles having three or more layers by adding, between the step of producing the copolymer (I) and the step of producing the copolymer (II), a step of supplying a polymerizable unsaturated monomer (one type or a mixture of two or more types) that forms another resin layer, and implementing emulsion polymerization.

Note that, in the present invention, the "shell" of the water-dispersible hydroxyl group-containing acrylic resin (A11) refers to the polymer layer present in the outermost layer of the resin particle, the "core" means the polymer layer of the inner layer of the resin particle excluding the shell portion, and the "core/shell structure" means a structure having the core and the shell. The core/shell structure described above is typically a layer structure in which the core is completely covered by the shell, but depending on the mass ratio and the like of the core and shell, the amount of the monomer of the shell may be insufficient for forming a layer structure. In such a case, it is not necessary to have a complete layer structure as described above, and the structure may be a structure in which a portion of the core is covered by the shell, or a structure in which a polymerizable unsaturated monomer that is a constituent element of the shell is graft polymerized with a portion of the core. Furthermore, the concept of a multi-layer structure with regard to the core/shell structure is also similarly applicable in a case in which a multi-layer structure is formed in the core in the water-dispersible hydroxyl group-containing acrylic resin (A11).

From the viewpoint of storage stability and the like of the resulting coating composition, the ratio of the copolymer (I) and the copolymer (II) in the water-dispersible hydroxyl group-containing acrylic resin (A11) having a core/shell multi-layer structure is, in terms of a solid content mass ratio of the copolymer (I)/copolymer (II), typically preferably in a range from 10/90 to 90/10, particularly preferably 50/50 to 85/15, and more particularly preferably 65/35 to 80/20.

The water-dispersible hydroxyl group-containing acrylic resin (A11) produced as described above can generally have an average particle size in a range from 10 to 1000 nm, and in particular 20 to 500 nm.

In the present specification, the average particle size of the hydroxyl group-containing acrylic resin is a value measured at 20° C. using a particle size distribution measurement device based on a dynamic light scattering method after dilution with deionized water by a common method. As the particle size distribution measurement device based on the dynamic light scattering method, for example, "ELSZ-2000" (trade name, available from Otsuka Electronics Co., Ltd.) can be used.

To improve the mechanical stability of the water dispersion particles of the produced water-dispersible hydroxyl group-containing acrylic resin (A11), the acidic groups of the water-dispersible hydroxyl group-containing acrylic resin (A11), such as the carboxyl group, are desirably neutralized by a neutralizing agent. The neutralizing agent can be used without any particular limitation as long as it can neutralize the acidic groups. Examples include sodium hydroxide, potassium hydroxide, trimethylamine, 2-(dimethylamino)ethanol, 2-amino-2-methyl-1-propanol, triethylamine, and ammonia water. The neutralizing agent is preferably used in an amount that makes the pH of the aqueous dispersion of the dispersible hydroxyl group-containing acrylic resin (A11) after the neutralization becomes approximately 6.5 to approximately 9.0.

Furthermore, the water-dispersible hydroxyl group-containing acrylic resin (A11) can contain a water-dispersible hydroxyl group-containing acrylic resin (A11') containing a gradient polymer layer.

The gradient polymer layer of the water-dispersible hydroxyl group-containing acrylic resin (A11') containing a gradient polymer layer means a polymer layer having a layer structure in which the composition continuously changes (having a compositional gradient).

More specifically, the gradient polymer layer means a polymer layer having a compositional gradient in which the monomer (or monomer mixture) composition continuously changes from monomer A (or monomer mixture A) to monomer B (or monomer mixture B), for example.

The gradient polymer layer usually can be produced by a known polymerization method called power feed polymerization. Specifically, for example, when two types of monomers, monomer A (or monomer mixture A) and monomer B (or monomer mixture B), are subjected to a polymerization reaction, the gradient polymer layer can be produced by adding the monomer B (or monomer mixture B) dropwise into a container containing the monomer A (or monomer mixture A) and, at the same time, introducing the monomer A (or monomer mixture A) into a reaction vessel to perform a polymerization reaction.

In the power feed polymerization, a gradient polymer layer having a desired compositional gradient can be formed by setting the synthesis conditions [such as the timing to start mixing the monomer A (or monomer mixture A) and the monomer B (or monomer mixture B), the speed of adding the monomer B (or monomer mixture B) dropwise into the container containing the monomer A (or monomer mixture A), the speed of introducing the monomer A (or monomer mixture A) into the reaction vessel, and the like].

The water-dispersible hydroxyl group-containing acrylic resin (A11') containing a gradient polymer layer is an acrylic resin containing a core portion made of a copolymer (I) containing a polymerizable unsaturated monomer as a copolymerization component, a shell portion made of a copolymer (II) containing a polymerizable unsaturated monomer as a copolymerization component, and a gradient polymer layer present in between the core portion and the shell portion.

For the polymerizable unsaturated monomers which are each a component monomer of each of the core portion and the shell portion, the hydroxyl group-containing polymerizable unsaturated monomer and the additional polymerizable unsaturated monomer that is copolymerizable with the hydroxyl group-containing polymerizable unsaturated monomer can be appropriately combined and used.

To produce the water-dispersible hydroxyl group-containing acrylic resin (A11') containing a gradient polymer layer, first, an emulsion of a core portion copolymer (I) is prepared by emulsion-polymerization of a polymerizable unsaturated monomer mixture.

The emulsion-polymerization for preparing an emulsion of the core portion copolymer (I) can be carried out by a commonly-known method. For example, the emulsion-polymerization can be carried out by subjecting a polymerizable unsaturated monomer mixture to emulsion polymerization using a polymerization initiator and in the presence of an emulsifier. As the emulsifier and the polymerization initiator, for example, the emulsifier and the polymerization initiator described above can be used.

To produce the water-dispersible hydroxyl group-containing acrylic resin (A11') containing a gradient polymer layer, a gradient polymer layer is then formed. The gradient polymer layer can be formed by the power feed polymerization described above.

For the formation of the gradient polymer layer, typically, the polymerizable unsaturated monomer mixture used for emulsion-polymerization of the core portion copolymer (I)

and a polymerizable unsaturated monomer mixture used for emulsion-polymerization of the shell portion copolymer (II) can be used.

The water-dispersible hydroxyl group-containing acrylic resin (A11') containing a gradient polymer layer can be produced by further forming a shell portion copolymer (II).

The monomer mixture for forming the shell portion copolymer (II) may appropriately contain components such as the polymerization initiator, a chain transfer agent, a reducing agent, and an emulsifier, optionally. In addition, the monomer mixture, while can be added dropwise as is, is preferably added dropwise as a monomer emulsion after being dispersed in an aqueous medium. The particle size of the monomer emulsion in this case is not particularly limited.

Examples of the method for polymerizing the monomer mixture for forming the shell portion copolymer (II) include a method of adding, all at once or gradually and dropwise, the monomer mixture or an emulsion thereof to the emulsion of the core portion copolymer (1), and heating the mixture to a suitable temperature while stirring.

From the viewpoint of water resistance and the like of the resulting coating film, the ratio of the gradient polymer layer in the water-dispersible hydroxyl group-containing acrylic resin (A11') containing a gradient polymer layer is preferably in a range from 20 to 80 mass %, more preferably in a range from 25 to 75 mass %, and particularly preferably in a range from 30 to 70 mass %, based on the total amount of the copolymer components of the water-dispersible hydroxyl group-containing acrylic resin (A11') containing a gradient polymer layer.

From the viewpoints of curability, chipping resistance, adhesion, finished appearance, and the like of the resulting coating film, the hydroxyl value of the water-dispersible hydroxyl group-containing acrylic resin (A11') containing a gradient polymer layer is preferably in a range from 1 to 150 mg KOH/g, more preferably in a range from 2 to 120 mg KOH/g, and particularly preferably in a range from 5 to 100 mg KOH/g.

From the viewpoints of water resistance, chipping resistance, and the like of the resulting coating film, the hydroxyl value of the core portion of the water-dispersible hydroxyl group-containing acrylic resin (A11') containing a gradient polymer layer is preferably in a range from 0 to 150 mg KOH/g, more preferably in a range from 5 to 120 mg KOH/g, and particularly preferably in a range from 10 to 100 mg KOH/g.

From the viewpoints of water resistance, chipping resistance, and the like of the resulting coating film, the hydroxyl value of the shell portion of the water-dispersible hydroxyl group-containing acrylic resin (A11') containing a gradient polymer layer is preferably in a range from 0 to 150 mg KOH/g, more preferably in a range from 2 to 120 mg KOH/g, and particularly preferably in a range from 5 to 100 mg KOH/g.

From the viewpoints of storage stability of the resulting coating material, water resistance of the coating film to be formed, and the like, the acid value of the water-dispersible hydroxyl group-containing acrylic resin (A11') containing a gradient polymer layer is preferably in a range from 1 to 80 mg KOH/g, more preferably in a range from 5 to 50 mg KOH/g, and particularly preferably in a range from 5 to 30 mg KOH/g.

From the viewpoints of production stability and storage stability of the resulting coating material and the like, the acid value of the core portion of the water-dispersible hydroxyl group-containing acrylic resin (A11') containing a gradient polymer layer is preferably in a range from 0 to 50 mg KOH/g, more preferably in a range from 0 to 30 mg KOH/g, and particularly preferably in a range from 0 to 10 mg KOH/g.

From the viewpoints of storage stability of the resulting coating material, water resistance of the coating film to be formed, and the like, the acid value of the shell portion of the water-dispersible hydroxyl group-containing acrylic resin (A11') containing a gradient polymer layer is preferably in a range from 1 to 100 mg KOH/g, more preferably in a range from 5 to 80 mg KOH/g, and particularly preferably in a range from 10 to 50 mg KOH/g.

From the viewpoints of water resistance, hardness, chipping resistance, and the like of the coating film to be formed, the glass transition temperature of the water-dispersible hydroxyl group-containing acrylic resin (A11') containing a gradient polymer layer is preferably 20° C. or higher, more preferably 30° C. or higher, and particularly preferably from 30 to 100° C.

From the viewpoints of water resistance, hardness, film forming ability, chipping resistance, and the like of the coating film to be formed, the glass transition temperature of the core portion of the water-dispersible hydroxyl group-containing acrylic resin (A11') containing a gradient polymer layer is preferably in a range from −50 to 50° C., more preferably in a range from −30 to 50° C., and particularly preferably in a range from 0 to 50° C.

From the viewpoints of hardness, water resistance, and the like of the coating film to be formed, the glass transition temperature of the shell portion of the water-dispersible hydroxyl group-containing acrylic resin (A11') containing a gradient polymer layer is preferably 40° C. or higher, more preferably 50° C. or higher, and particularly preferably in a range from 50 to 100° C.

Note that, in the present specification, the glass transition temperature Tg of the water-dispersible hydroxyl group-containing acrylic resin (A11') containing a gradient polymer layer is a value calculated by the following equation.

$$1/Tg\,(K) = W1/T1 + W2/T2 + \dots Wn/Tn$$
$$Tg\,(^\circ C.) = Tg\,(K) - 273$$

where W1, W2, . . . Wn are mass fractions of the respective monomers, and T1, T2, . . . Tn are glass transition temperatures Tg (K) of homopolymers of the respective monomers.

Note that the glass transition temperatures of the homopolymers of the respective monomers each are a value in accordance with POLYMER HANDBOOK Fourth Edition, edited by J. Brandrup, E. h. Immergut, E. A. Grulke (1999), and the glass transition temperature of a monomer not described in this literature is a value measured by synthesizing a homopolymer of the monomer in a manner that the weight average molecular weight becomes approximately 50000 and then measuring the glass transition temperature thereof by differential scanning calorimetry.

In a case where the coating composition of an embodiment of the present invention contains the hydroxyl group-containing acrylic resin (A1), from the viewpoints of flip-flop effect, chipping resistance, and the like of the resulting coating film, the content of the hydroxyl group-containing acrylic resin (A1) is preferably in a range from 1 to 60 mass %, more preferably in a range from 10 to 55 mass %, and particularly preferably in a range from 15 to 50 mass %, based on the resin solid content in the coating composition.

Hydroxyl Group-Containing Polyester Resin (A2)

The hydroxyl group-containing polyester resin (A2) can be produced, for example, by using a polyol having two or more hydroxyl groups as an alcohol component and using a polycarboxylic acid having two or more carboxyl groups as an acid component and by condensing the alcohol component and the acid component.

As the polyol, a polyhydric alcohol having two or more hydroxyl groups per molecule can be suitably used. Examples of the polyhydric alcohols include dihydric alcohols, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyl trimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentylglycol, 1,4-cyclohexane dimethanol, tricyclodecane dimethanol, neopentylglycol hydroxypivalate, hydrogenated bisphenol A, hydrogenated bisphenol F, and dimethylol propionate; polylactone diols produced by adding a lactone compound such as ε-caprolactone to these dihydric alcohols; ester diol compounds such as bis(hydroxyethyl) terephthalate: polyether diol compounds such as an alkylene oxide adduct of bisphenol A, polyethylene glycol, polypropylene glycol, and polybutylene glycol; trihydric and higher polyhydric alcohols, such as glycerin, trimethylol ethane, trimethylol propane, diglycerin, triglycerine, 1,2,6-hexanetriol, pentaerythritol, dipentaerythritol, tris(2-hydroxyethyl)isocyanurate, sorbitol, and mannitol; polylactone polyol compounds produced by adding a lactone compound such as ε-caprolactone to these trihydric and higher polyhydric alcohols; and fatty acid ester compounds of glycerin.

Furthermore, an alcohol component other than the polyols described above can be used. Such an alcohol component is not particularly limited, and examples thereof include mono-alcohols such as methanol, ethanol, propyl alcohol, butyl alcohol, stearyl alcohol, and 2-phenoxyethanol; and alcohol compounds produced by reacting an acid with a monoepoxy compound such as a propylene oxide, butylene oxide, and "Cardura E10" (trade name, glycidyl ester of a synthetic highly-branched saturated fatty acid, available from Hexion Inc.).

As the polycarboxylic acid, a compound commonly used in the production of a polyester resin can be used. Examples of such a polycarboxylic acid include an aliphatic polybasic acid, an alicyclic polybasic acid, and an aromatic polybasic acid.

The aliphatic polybasic acid is generally an aliphatic compound having two or more carboxyl groups per molecule, an acid anhydride of the aliphatic compound, and an esterified product of the aliphatic compound. Examples of the aliphatic polybasic acid include aliphatic polybasic carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid, and butanetetracarboxylic acid; anhydrides of these aliphatic polybasic carboxylic acids; and esterified products of lower alkyls having 1 to 6 carbons, preferably 1 to 4 carbons, of the aliphatic polybasic carboxylic acids. The aliphatic polybasic acids can be each used alone, or in combination of two or more.

The alicyclic poly basic acid is generally a compound having one or more alicyclic structures and two or more carboxyl groups per molecule, an acid anhydride of the compound, or an esterified product of the compound. The alicyclic structure can be primarily a ring structure of four to six members. Examples of the alicyclic polybasic acid include alicyclic polybasic carboxylic acids such as 1,2-cyclohexane dicarboxylic acid, 1,3-cyclohexane dicarboxylic acid, 1,4-cyclohexane dicarboxylic acid, 4-cyclohexene-1,2-dicarboxylic acid, 3-methyl-1,2-cyclohexane dicarboxylic acid, 4-methyl-1,2-cyclohexane dicarboxylic acid, 1,2,4-cyclohexane tricarboxylic acid, and 1,3,5-cyclohexane tricarboxylic acid; anhydrides of the alicyclic polybasic carboxylic acids; and esterified products of lower alkyls having 1 to 6 carbons, preferably 1 to 4 carbons, of the alicyclic polybasic carboxylic acids. The alicyclic polybasic acids can be each used alone, or in combination of two or more.

The aromatic polybasic acid is generally an aromatic compound having two or more carboxyl groups per molecule, an acid anhydride of the aromatic compound, and an esterified product of the aromatic compound. Examples of the aromatic polybasic acid include: aromatic polybasic carboxylic acids, such as phthalic acid, isophthalic acid, terephthalic acid, naphthalene dicarboxylic acid, 4,4'-biphenyl dicarboxylic acid, trimellitic acid, and pyromellitic acid; anhydrides of these aromatic polybasic carboxylic acids; and esterified products of lower alkyls having 1 to 6 carbons, preferably, 1 to 4 carbons, of these aromatic polybasic carboxylic acids. The aromatic polybasic acids can be each used alone, or in combination of two or more. As the aromatic polybasic acid, phthalic acid, phthalic anhydride, isophthalic acid, trimellitic acid, and trimellitic anhydride are preferably used. Of these, trimellitic anhydride is more preferably used.

In addition, an acid component other than the aliphatic polybasic acid, the alicyclic polybasic acid, and the aromatic polybasic acid can be used. Such acid component is not particularly limited, and examples include fatty acids, such as coconut oil fatty acid, cotton seed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid: monocarboxylic acids such as lauric acid, myristic acid, palmitic acid, stearic acid, oleic acid, linoleic acid, linolenic acid, benzoic acid, p-tert-butylbenzoic acid, cyclohexanoic acid, and 10-phenyloctadecanoic acid; and hydroxycarboxylic acids such as lactic acid, 3-hydroxybutanoic acid and 3-hydroxy-4-ethoxybenzoic acid. These acid components can be each used alone, or in combination of two or more.

The method for producing a hydroxyl group-containing polyester resin (A2) is not particularly limited, and the hydroxyl group-containing polyester resin (A2) can be produced according to a typical method. For example, the hydroxyl group-containing polyester resin (A2) can be produced by a method in which the alcohol component and the acid component are heated at approximately 150 to 250° C. in a nitrogen stream for approximately 5 to 10 hours to cause an esterification reaction or a transesterification reaction between the alcohol component and the acid component.

To cause the alcohol component and the acid component to be under the esterification reaction or transesterification reaction, these components may be added all at once into a reaction vessel, or one or both components may be added in multiple batches. Also, first, the hydroxyl group-containing polyester resin may be synthesized, and then an acid anhydride may be reacted with the resulting hydroxyl group-containing polyester resin to form a half-ester and produce a carboxyl group- and hydroxyl group-containing polyester resin. In addition, first, the carboxyl group-containing polyester resin may be synthesized, and then the alcohol component may be added to produce a hydroxyl group-containing polyester resin.

For the esterification or transesterification reaction, a catalyst known per se can be used as a catalyst for promoting the reaction. Examples of such catalysts include dibutyltin oxide, antimony trioxide, zinc acetate, manganese acetate, cobalt acetate, calcium acetate, lead acetate, tetrabutyl titanate, and tetraisopropyl titanate.

Furthermore, the hydroxyl group-containing polyester resin (A2) can be modified with a fatty acid, a monoepoxy compound, a polyisocyanate compound, or the like during or after preparation of the resin.

Examples of the fatty acid include coconut oil fatty acid, a cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, a dehydrated castor oil fatty acid, and safflower oil fatty acid. Further, as the monoepoxy compound, for example, "Cardura E10P" (trade name, glycidyl ester of a synthetic highly-branched saturated fatty acid, available from Hexion Inc.) can be suitably used.

Furthermore, as the polyisocyanate compound, polyisocyanate compounds exemplified for the polyisocyanate compounds (B2) can be used. These can be used alone or in combination of two or more types.

The hydroxyl value of the hydroxyl group-containing polyester resin (A2) is preferably in a range from 1 to 200 mg KOH/g, more preferably in a range from 2 to 180 mg KOH/g, and particularly preferably in a range from 5 to 170 mg KOH/g, from the viewpoints of storage stability of the resulting coating composition, suppression of metallic color irregularities of the coating film to be formed, and the like.

Furthermore, from the viewpoints of storage stability of the resulting coating composition, suppression of metallic color irregularities of the coating film to be formed, and the like, the weight average molecular weight of the hydroxyl group-containing polyester resin (A2) is preferably in a range from 500 to 50000, more preferably in a range from 1000 to 30000, and particularly preferably in a range from 1200 to 20000.

Furthermore, from the viewpoints of storage stability of the resulting coating composition, suppression of metallic color irregularities of the coating film to be formed, and the like, the glass transition temperature (Tg) of the hydroxyl group-containing polyester resin (A2) is preferably in a range from −20° C. to 50° C., more preferably in a range from −10° C. to 40° C., and particularly preferably in a range from −5° C. to 35° C.

From the viewpoint of the storage stability and the like of the resulting coating composition, the hydroxyl group-containing polyester resin (A2) preferably contains a carboxyl group.

From the viewpoints of storage stability of the resulting coating composition, suppression of metallic color irregularities of the coating film to be formed, and the like, in a case where the hydroxyl group-containing polyester resin (A2) contains a carboxyl group, the acid value of the hydroxyl group-containing polyester resin (A2) is preferably in a range from 5 to 150 mg KOH/g, more preferably in a range from 10 to 140 mg KOH/g, and particularly preferably in a range from 15 to 120 mg KOH/g.

In a case where the coating composition of an embodiment of the present invention contains the hydroxyl group-containing polyester resin (A2), from the viewpoints of storage stability of the resulting coating composition, suppression of metallic color irregularities of the coating film to be formed, and the like, the content of the hydroxyl group-containing polyester resin (A2) is preferably in a range from 1 to 45 mass %, more preferably in a range from 5 to 40 mass %, and particularly preferably in a range from 10 to 35 mass %, based on the resin solid content in the coating composition.

Hydroxyl Group-Containing Polyurethane Resin (A3)

Examples of the hydroxyl group-containing polyurethane resin (A3) include a hydroxyl group-containing polyurethane resin produced by reacting a polyol with a polyisocyanate.

Examples of the polyol having a low molecular weight include dihydric alcohols such as ethylene glycol, diethylene glycol, propylene glycol, butylene glycol, and hexamethylene glycol; and trihydric alcohols such as trimethylolpropane, and glycerin; and pentaerythritol. Examples of the polyol compound having a high molecular weight include polyether polyol, polyester polyol, acrylic polyol, and epoxy polyol. Examples of the polyether polyol include polyethylene glycol, polypropylene glycol, and polytetramethylene glycol. Examples of the polyester polyol include a polycondensation product of an alcohol such as the above-mentioned dihydric alcohol, dipropylene glycol, 1,4-butanediol, 1,6-hexanediol, or neopentyl glycol and a dibasic acid such as adipic acid, azelaic acid, or sebacic acid: a lactone-based ring-opened polymer polyol such as polycaprolactone; and a polycarbonate diol. Furthermore, carboxyl group-containing polyols such as 2,2-dimethylol propionic acid and 2,2-dimethylol butanoic acid can also be used.

Examples of the polyisocyanate to be reacted with the polyol include: aliphatic polyisocyanate compounds such as hexamethylene diisocyanate, trimethylhexamethylene diisocyanate, dimeric acid diisocyanate, and lysine diisocyanate, as well as biuret type adducts or isocyanurate ring adducts of these polyisocyanates; alicyclic diisocyanate compounds such as isophorone diisocyanate, 4,4'-methylenebis(cyclohexylisocyanate), methylcyclohexane-2,4- (or 2,6-)diisocyanate, 1,3- (or 1,4-)di(isocyanatomethyl)cyclohexane, 1,4-cyclohexane diisocyanate, 1,3-cyclopentane diisocyanate, and 1,2-cyclohexane diisocyanate, as well as biuret type adducts or isocyanurate ring adducts of these polyisocyanates; aromatic diisocyanate compounds such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4-toluidine diisocyanate, 4,4'-diphenylether diisocyanate, (m- or p-)phenylene diisocyanate, 4,4'-biphenylene diisocyanate, 3,3'-dimethyl-4,4'-biphenylene diisocyanate, bis(4-isocyanatophenyl)sulfone, and isopropylidenebis-(4-phenylisocyanate), as well as biuret type adducts or isocyanurate ring adducts of these polyisocyanates; polyisocyanate compounds having at least three isocyanate groups per molecule such as triphenylmethane-4,4',4"-triisocyanate, 1,3,5-triisocyanatobenzene, 2,4,6-triisocyanatotoluene, and 4,4'-dimethyldiphenylmethane-2,2',5,5'-tetraisocyanate, as well as biuret type adducts or isocyanurate ring adducts of these polyisocyanate compounds.

The hydroxyl value of the hydroxyl group-containing polyurethane resin (A3) is preferably in a range from 1 to 150 mg KOH/g, more preferably in a range from 1 to 100 mg KOH/g, and particularly preferably in a range from 1 to 50 mg KOH/g, from the viewpoints of storage stability of the resulting coating composition, suppression of metallic color irregularities of the coating film to be formed, and the like.

The acid value of the hydroxyl group-containing polyurethane resin (A3) is preferably in a range from 3 to 90 mg KOH/g, more preferably in a range from 4 to 70 mg KOH/g, and particularly preferably in a range from 5 to 50 mg KOH/g, from the viewpoints of storage stability of the resulting coating composition, suppression of metallic color irregularities of the coating film to be formed, and the like.

From the viewpoints of storage stability of the resulting coating composition, suppression of metallic color irregularities of coating film to be formed, and the like, the number average molecular weight of the hydroxyl group-containing polyurethane resin (A3) is preferably 10000 or greater, more preferably 50000 or greater, and particularly preferably 10000 or greater.

In a case where the coating composition of an embodiment of the present invention contains the hydroxyl group-containing polyurethane resin (A3), from the viewpoints of storage stability of the resulting coating composition, suppression of metallic color irregularities of coating film to be formed, and the like, the content of the hydroxyl group-containing polyurethane resin (A3) is preferably in a range from 3 to 60 mass %, more preferably in a range from 5 to 40 mass %, and particularly preferably in a range from 7 to 30 mass %, based on the resin solid content in the coating composition.

Curing Agent (B)

The curing agent (B) is not particularly limited. For example, a crosslinking agent that is reactive with a hydroxyl group of the hydroxyl group-containing resin (A) can be used.

Examples of the curing agent (B) include known crosslinking agents, and specific examples thereof include an amino resin (B1), a polyisocyanate compound (B2), a blocked polyisocyanate compound (B3), a polyhydrazide compound, a polysemicarbazide compound, a carbodiimide compound, an oxazoline group-containing compound, an epoxy compound, and a polycarboxylic acid. The crosslinking agent may be used alone or in combination of two or more.

From the viewpoints of chipping resistance and the like of the coating film to be formed, the curing agent (B) preferably contains at least one crosslinking agent selected from the group consisting of the amino resin (B1), the polyisocyanate compound (B2), and the blocked polyisocyanate compound (B3), more preferably contains the amino resin (B1) and/or the blocked polyisocyanate compound (B3), and particularly preferably contains the amino resin (B1) and the blocked polyisocyanate compound (B3).

Amino Resin (B1)

As the amino resin (B1), a partially methylolated amino resin or a completely methylolated amino resin produced by a reaction of an amino component with an aldehyde component can be used. Examples of the amino component include melamine, urea, benzoguanamine, acetoguanamine, steroguanamine, spiroguanamine, and dicyandiamide. Examples of the aldehyde component include formaldehyde, paraformaldehyde, acetaldehyde, and benzaldehyde.

It is also possible to use one produced by partially or completely etherifying methylol groups of the methylolated amino resin with a suitable alcohol. Examples of the alcohol to be used for the etherification include methyl alcohol, ethyl alcohol, n-propyl alcohol, isopropyl alcohol, n-butyl alcohol, isobutyl alcohol, 2-ethyl-1-butanol, and 2-ethyl-1-hexanol.

As the amino resin (B1), a melamine resin is preferable. A methyl-etherified melamine resin produced by partially or completely etherifying methylol groups of a partially or completely methylolated melamine resin with methyl alcohol, a butyl-etherified melamine resin produced by partially or completely etherifying methylol groups of a partially or completely methylolated melamine resin with butyl alcohol, or a methyl-butyl mixed etherified melamine resin produced by partially or completely etherifying methylol groups of a partially or completely methylolated melamine resin with methyl alcohol and butyl alcohol is preferable, and a methyl-butyl mixed etherified melamine resin is more preferable.

The melamine resin has a weight average molecular weight of preferably in a range from 450 to 6000, more preferably in a range from 500 to 4000, and particularly preferably in a range from 550 to 3000.

As the melamine resin, a commercially available product can be used. Examples of trade names of the commercially available products include "CYMEL 202", "CYMEL 203". "CYMEL 211", "CYMEL 238", "CYMEL 251", "CYMEL 254", "CYMEL 303", "CYMEL 325", "CYMEL 327", "CYMEL 350", "CYMEL 370", "CYMEL 385", "CYMEL 1156", "CYMEL 1158", and "CYMEL 1130" (all available from Allnex Japan Inc.), and "U-VAN 20SE60" and "U-VAN 28-60" (all available from Mitsui Chemicals, Inc.).

In a case where the melamine resin is used as the curing agent (B), optionally, a sulfonic acid such as p-toluenesulfonic acid, dodecylbenzenesulfonic acid, or dinonylnaphthalenesulfonic acid; a neutralized salt of the sulfonic acid with an amine; a neutralized salt of a phosphoric acid ester compound with an amine; or the like can be used as a curing catalyst.

The amino resin (B1) can be used, for example, as a crosslinking agent for a resin containing a hydroxyl group.

Polyisocyanate Compound (B2)

The polyisocyanate compound (B2) is a compound having two or more isocyanate groups per molecule.

Examples of the polyisocyanate compound (B2) include an aliphatic polyisocyanate, an alicyclic polyisocyanate, an aromatic-aliphatic polyisocyanate, an aromatic polyisocyanate, and a derivative of the polyisocyanates.

Examples of the aliphatic polyisocyanates include: aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the alicyclic polyisocyanates include: alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (commonly known as isophorone diisocyanate), methyl-2,4-cyclohexane diisocyanate, methyl-2,6-cyclohexane diisocyanate, 1,3- or 1,4-bis(isocyanatomethyl)cyclohexane (commonly known as hydrogenated xylylene diisocyanate) or its mixture, and norbornane diisocyanate; and alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane.

Examples of the aromatic-aliphatic polyisocyanates include: aromatic-aliphatic diisocyanates, such as 1,3- or 1,4-xylylene diisocyanate or its mixture, ω,ω'-diisocyanato-1,4-diethylbenzene, and 1,3- or 1,4-bis(1-isocyanato-1-methylethyl)benzene (commonly known as tetramethylxylylene diisocyanate) or its mixture; and aromatic-aliphatic triisocyanates, such as 1,3,5-triisocyanatomethylbenzene.

Examples of the aromatic polyisocyanates include: aromatic diisocyanates, such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or its mixture, 2,4- or 2,6-tolylene diisocyanate or its mixture, 4,4'-toluidine diisocyanate, and 4,4'-diphenyl ether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as 4,4'-diphenylmethane-2,2',5,5'-tetraisocyanate.

Examples of the derivatives of the polyisocyanates include dimers, trimers, biuret, allophanate, uretdione, uretoimine, isocyanurates, oxadiazinetrione, polymethylene polyphenyl polyisocyanates (crude MDI and polymeric MDI), and crude TDI of the polyisocyanate compounds described above.

The polyisocyanates and their derivatives may each be used alone or in combination of two or more. Among these polyisocyanates, aliphatic diisocyanates, alicyclic diisocyanates, and the derivatives thereof are each suitably used alone or in combination of two or more.

In addition, as the polyisocyanate compound (B2), a prepolymer formed by urethanization reaction of the polyisocyanate and its derivative described above with a polyhydric alcohol, a low molecular weight polyester resin, or water under a condition of excess isocyanate groups may be used.

When the polyisocyanate compound (B2) is used as the curing agent (B), an organometallic compound, an acid compound, a basic compound, or the like can be used as a curing catalyst, optionally.

The polyisocyanate compound (B2) can be used, for example, as a crosslinking agent for a resin containing a hydroxyl group or amino group.

Blocked Polyisocyanate Compound (B3)

The blocked polyisocyanate compound (B3) is a compound prepared by blocking isocyanate groups of the polyisocyanate compound (B2) with a blocking agent.

Examples of the blocking agent include: phenolic blocking agents, such as phenol, cresol, xylenol, nitrophenol, ethylphenol, hydroxydiphenyl, butylphenol, isopropylphenol, nonylphenol, octylphenol, and methyl hydroxybenzoate; lactam-based blocking agents, such as ε-caprolactam, S-valerolactam, f-butyrolactam, and β-propiolactam; aliphatic alcohol-based blocking agents, such as methanol, ethanol, propyl alcohol, butyl alcohol, amyl alcohol, and lauryl alcohol; ether-based blocking agents, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol-based blocking agents, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime-based blocking agents, such as formamide oxime, acetoamide oxime, acetoxime, methyl ethyl ketoxime, diacetyl monoxime, benzophenone oxime, and cyclohexane oxime; active methylene-based blocking agents, such as dimethyl malonate, diethyl malonate, ethyl acetoacetate, methyl acetoacetate, and acetylacetone; mercaptan-based blocking agents, such as butyl mercaptan, tert-butyl mercaptan, hexyl mercaptan, tert-dodecyl mercaptan, 2-mercaptobenzothiazole, thiophenol, methylthiophenol, and ethylthiophenol; acid amide-based blocking agents, such as acetanilide, acetanisidide, acetotoluide, acrylamide, methacrylamide, acetic amide, stearic amide, and benzamide; imide-based blocking agents, such as succinimide, phthalimide, and maleimide; amine-based blocking agents, such as diphenylamine, phenylnaphthylamine, xylidine, N-phenylxylidine, carbazole, aniline, naphthylamine, butylamine, dibutylamine, and butylphenylamine; imidazole-based blocking agents, such as imidazole and 2-ethylimidazole; urea-based blocking agents, such as urea, thiourea, ethyleneurea, ethylenethiourea, and diphenylurea; carbamic ester-based blocking agents, such as phenyl N-phenylcarbamate; imine-based blocking agents, such as ethyleneimine and propyleneimine; sulfite-based blocking agents, such as sodium bisulfite and potassium bisulfite; and azole-based blocking agents. Examples of the azole-based blocking agents include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

Among them, suitable examples of the blocking agent include oxime-based blocking agents, active methylene-based blocking agents, and pyrazole or pyrazole derivatives.

Furthermore, as the blocking agent, it is also possible to use hydroxycarboxylic acids having one or more hydroxyl groups and one or more carboxyl groups, such as hydroxypivalic acid and dimethylolpropionic acid.

In the coating composition of an embodiment of the present invention, in a case of using the blocked polyisocyanate, it is possible to suitably use a blocked polyisocyanate compound produced by blocking an isocyanate group using the hydroxycarboxylic acid and then neutralizing a carboxyl group of the hydroxycarboxylic acid to impart water dispersibility.

From the viewpoints of appearance of the coating film to be formed and adhesion between the coating film to be formed and a substrate, the blocked polyisocyanate compound (B3) preferably contains a structure derived from a spacer having at least 2 isocyanate-reactive functional groups.

The functional groups are not limited as long as they are functional groups that are reactive with isocyanate groups.

Examples of isocyanate-reactive functional groups include a hydroxyl group, an amino group, a carboxyl group, and a thiol group. In particular, for the isocyanate-reactive functional groups a hydroxyl group or an amino group is preferable, and a hydroxyl group is particularly preferable.

Therefore, the spacer is preferably a compound having at least two hydroxyl groups or a compound having at least two amino groups, and more preferably a compound having at least two hydroxyl groups.

Examples of the compound having at least two hydroxyl groups include low-molecular-weight compounds, including dihydric alcohols such as ethylene glycol, diethylene glycol, propylene glycol, butylene glycol, and hexamethylene glycol, and trihydric alcohols such as trimethylolpropane, and glycerin, and pentaerythritol, and high-molecular-weight compounds, such as polyether polyols, polyester polyols, acrylic polyols, and epoxy polyols. In particular, from the viewpoint of storage stability and the like of the resulting coating composition, a polyether polyol is preferred.

As the polyether polyol, alkyleneoxide adducts, alkylene oxides, or ring-opening (co)polymers of cyclic ether (such as tetrahydrofuran) of the compound having at least two hydroxyl groups introduced for low-molecular-weight compounds can be used. Specific examples thereof include polyethylene glycol, polypropylene glycol, (block or random) copolymers of ethylene glycol-propylene glycol, polytetramethylene glycol, polyhexamethylene glycol, and poly octamethylene glycol.

Among these, as the polyether polyol, polyethylene glycol, polypropylene glycol, and polytetramethylene glycol can be suitably used.

The polyether polyols can each be used alone or in combination of two or more types.

An example of the compound having at least two anno groups includes a polyetheramine.

The polyetheramine may be a commercially available product. Examples of commercially available products of the polyetheramine include "JEFFAMINE D-400", "JEFFAMINE D-2000", "JEFFAMINE D-4000", "JEFFAMINE ED-600", "JEFFAMINE ED-900", "JEFFAMINE ED-2003", "ELASTAMINE RT-1000", "JEFFAMINE T-403", "JEFFAMINE T-3000", and "JEFFAMINE T-5000", all available from Huntsman Corporation.

From the viewpoints of storage stability of the resulting coating composition, suppression of metallic color irregularities of the coating film to be formed, and the like, the molecular weight of the spacer is preferably in a range from 500 to 6000, more preferably in a range from 800 to 5000, and even more preferably in a range from 1500 to 3500.

From the viewpoint of the storage stability and the like of the resulting coating composition, the spacer preferably has from 2 to 3 functional groups, and more preferably has 2 functional groups.

The polyisocyanate compound containing a structure derived from the spacer can be formed by reacting some of the isocyanate groups in the polyisocyanate compound with the spacer. In this case, from the viewpoints of storage stability, popping resistance, and the like of the resulting coating composition, the ratio of the polyisocyanate compound to the spacer is preferably arranged such that an amount of active hydrogen in the spacer is in a range from 0.03 to 0.6 mol based on 1 mol of isocyanate groups in the polyisocyanate compound. The blocked polyisocyanate compound containing a structure derived from the spacer can be formed by blocking the polyisocyanate compound containing a structure derived from the spacer.

From the viewpoints of storage stability, popping resistance, and the like of the resulting coating composition, the blocked polyisocyanate compound preferably contains a blocked polyisocyanate compound having a weight average molecular weight of 20000 to 200000.

When the blocked polyisocyanate compound (B3) is used as the curing agent (B), an organometallic compound, an acid compound, a basic compound, or the like can be used as a curing catalyst, optionally.

In the coating composition of an embodiment of the present invention, from the viewpoints of storage stability of the resulting coating composition, suppression of metallic color irregularities of the coating film to be formed, and the like, the content of the curing agent (B) is preferably in a range from 5 to 55 mass %, more preferably in a range from 10 to 50 mass %, and particularly preferably in a range from 15 to 45 mass %, based on the resin solid content in the coating composition.

Scale-Shaped Effect Pigment (C)

Examples of the scale-shaped effect pigment (C) include scale-shaped metallic pigments such as aluminum, copper, nickel alloy, and stainless steel, scale-shaped metallic pigments each having a surface coated with a metal oxide, scale-shaped metallic pigments in which a color pigment is chemically adsorbed on a surface, scale-shaped aluminum pigments in which an aluminum oxide layer is formed on a surface by allowing an oxidation-reduction reaction to occur, aluminum solid solution sheet oxidized iron pigments, glass flake pigments, glass flake pigments each having a surface coated with a metal oxide, glass flake pigments in which a color pigment is chemically adsorbed on a surface, glass flake pigments having a surface coated with a metal, interference mica pigments each having a surface coated with titanium dioxide, reduced mica pigments each produced by reduction from an interference mica pigment, colored mica pigments in which a color pigment is chemically adsorbed on a surface or a surface is coated with an iron oxide, graphite pigments having a surface coated with titanium dioxide, silica flakes having a surface coated with titanium dioxide, alumina flake pigments, sheet oxidized iron pigments, holographic pigments, synthetic mica pigments, cholesteric liquid crystal polymer pigments each having a helical structure, and bismuth oxychloride pigments.

Furthermore, from the viewpoint of photoluminescence of the coating film to be formed, the scale-shaped effect pigment (C) preferably contains a scale-shaped aluminum pigment (C1).

The scale-shaped aluminum pigment (C1) is typically produced by crushing and grinding aluminum using a grinding aid in the presence of a liquid grinding medium in a ball mill or an attritor mill. As the grinding aid, aliphatic amines, aliphatic amides, and aliphatic alcohols as well as higher fatty acids such as oleic acid, stearic acid, isostearic acid, lauric acid, palmitic acid, and myristic acid are used. As the liquid grinding medium, an aliphatic hydrocarbon such as mineral spirit is used.

The scale-shaped aluminum pigment (C1) can be roughly classified into a leafing type and a non-leafing type based on the type of the grinding aid. The leafing type scale-shaped aluminum pigment is arranged on a surface of a coating film (leafing) formed by application of a coating composition in which a leafing type scale-shaped aluminum pigment is blended, and achieves a highly metallic finish, thermal reflex action, and rust prevention, and thus is often used in various building materials and the like, such as a tank, a duct, piping, and roofing material for rooftop. From the viewpoint of depth of the coating film formed by the application of the coating composition of an embodiment of the present invention, use of a non-leafing type scale-shaped aluminum pigment is preferably used.

From the viewpoints of photoluminescence of the coating film to be formed and suppression of metallic color irregularities and the like, the average particle size of the scale-shaped aluminum pigment (C1) is preferably in a range from 5 to 30 μm, more preferably in a range from 7 to 25 μm, and particularly preferably in a range from 8 to 23 μm. Furthermore, the thickness of the scale-shaped aluminum pigment (C1) is preferably in a range from 0.05 to 5 μm. The average particle size herein means a median size based on volume-based particle size distribution measured by the laser diffraction scattering method using the Microtrac particle size distribution analyzer MT3300 (trade name, available from Nikkiso Co., Ltd.). The thickness is defined as an average value of at least 100 measurement values obtained by observing a coating film cross section containing the scale-shaped aluminum pigment (C1) using a microscope and measuring the thickness of the scale-shaped aluminum pigment (C1) using an image processing software.

Furthermore, in a case where the scale-shaped effect pigment (C) contains the scale-shaped aluminum pigment (C1), from the viewpoints of suppression of metallic color irregularities and water resistance of the coating film to be formed and the like, a silica-coated scale-shaped aluminum pigment (C11) is preferably contained as the scale-shaped aluminum pigment (C1).

As the silica-coated aluminum pigment, a commercially available product such as "Hydrolan series" (trade name, available from Eckart GmbH) and "Alpaste EMR series" (trade name, available from Toyo Aluminum K.K.) can be used.

In a case where the coating composition of an embodiment of the present invention contains the scale-shaped aluminum pigment (C1) as the scale-shaped effect pigment (C), from the viewpoints of photoluminescence of the coating film to be formed and suppression of metallic color irregularities and the like, the compounding amount thereof is preferably in a range from 1 to 50 parts by mass, more preferably in a range from 3 to 30 parts by mass, and particularly preferably in a range from 5 to 20 parts by mass, based on 100 parts by mass of the resin solid content in the coating composition.

Furthermore, in a case where the coating composition of an embodiment of the present invention contains the silica-coated scale-shaped aluminum pigment (C11) as the scale-shaped effect pigment (C), from the viewpoints of photoluminescence of the coating film to be formed and suppression of metallic color irregularities and the like, the compounding amount thereof is preferably in a range from 1 to 50 parts by mass, more preferably in a range from 3 to 30 parts by mass, and particularly preferably in a range from 5 to 20 parts by mass, based on 100 parts by mass of the resin solid content in the coating composition.

Furthermore, from the viewpoint of saturation and the like of the coating film to be formed, the scale-shaped effect pigment (C) preferably contains a scale-shaped light interference pigment (C2).

Examples of the scale-shaped light interference pigment (C2) include a colored pearl pigment in which a translucent scale-shaped base material is coated with a metal oxide such as iron oxide or titanium oxide, an interference pearl pigment, and the like.

Examples of the translucent scale-shaped base material include natural mica, synthetic mica, alumina flakes, silica flakes, and glass flakes.

The natural mica is a scale-shaped base material produced by crushing mineral mica. The synthetic mica is synthesized by heating an industrial raw material such as $SiO_2$, $MgO$, $Al_2O_3$, $K_2SiF_6$, or $Na_2SiF_6$ to melt it at a high temperature of approximately 1500° C. and then cooling and crystallizing it, and has less impurities and has more uniform size and thickness than the natural mica. Specifically, fluorophlogopite $(KMg_3AlSi_3O_{10}F_2)$, potassium tetrasilicon mica $(KMg_{25}AlSi_4O_{10}F_2)$, sodium tetrasilicon mica $(NaMg_{25}AlSi_4O_{10}F_2)$, Na taeniolite $(NaMg_2LiSi_4O_{10}F_2)$, LiNa taeniolite $(LiMg_2LiSi_4O_{10}F_2)$, and the like have been known.

The alumina flake means scale-shaped (thin leaf-like) aluminum oxide and is colorless and transparent. The alumina flake does not need to be formed of a single component of an aluminum oxide and may contain an oxide of another metal.

The silica flake is produced by applying a solution onto a metal sheet having a smooth surface or the like and drying and releasing and heat-treating the resulting scale-shaped gel, and the solution is produced by dissolving an alkoxide, such as methoxide, ethoxide, propoxide, or butoxide, of silicon in a solvent of an alcohol compound, such as methanol, ethanol, propanol, or butanol.

The glass flake is a base material having a smooth surface produced by forming a scale-shaped C-glass or E-glass.

The scale-shaped light interference pigment (C2) may be a scale-shaped light interference pigment that is surface-treated to improve dispersibility, water resistance, chemical resistance, weather resistance, and the like.

From the viewpoints of saturation of the coating film to be formed and suppression of metallic color irregularities, the average particle size of the scale-shaped light interference pigment (C2) is preferably in a range from 5 to 30 μm, more preferably in a range from 7 to 25 μm, and particularly preferably in a range from 8 to 23 μm. Furthermore, the thickness of the scale-shaped light interference pigment (C2) is preferably in a range from 0.05 to 5 μm. The average particle size herein means a median size based on volume-based particle size distribution measured by the laser diffraction scattering method using the Microtrac particle size distribution analyzer MT3300 (trade name, available from Nikkiso Co., Ltd.). The thickness is defined as an average value of at least 100 measurement values obtained by observing a coating film cross section containing the scale-shaped light interference pigment (C2) using a microscope and measuring the thickness of the scale-shaped light interference pigment (C2) using an image processing software.

Furthermore, in a case where the coating composition of an embodiment of the present invention contains the scale-shaped effect pigment (C2) as the scale-shaped effect pigment (C), from the viewpoints of storage stability of the coating composition, suppression of metallic color irregularities of the coating film to be formed, and the like, the total content thereof is preferably in a range from 1 to 50 parts by mass, more preferably in a range from 3 to 30 parts by mass, and particularly preferably in a range from 7 to 20 parts by mass, based on 100 parts by mass of the resin solid content in the coating composition.

Viscosity Modifier (D)

The coating composition of an embodiment of the present invention contains a viscosity modifier containing at least one viscosity modifier selected from the group consisting of a cellulose nanocrystal (D1) and a cellulose nanofiber (D2).

When the at least one viscosity modifier selected from the group consisting of a cellulose nanocrystal (D1) and a cellulose nanofiber (D2) is not contained, storage stability of the resulting coating composition becomes lower.

Furthermore, from the viewpoints of storage stability of the resulting coating composition, suppression of metallic color irregularities of the coating film to be formed, and the like, the viscosity modifier preferably contains the cellulose nanocrystal (D1).

In the present specification, the cellulose nanocrystal (D1) is a cellulose nanocrystal having a ratio of the number average fiber length to the number average fiber size (number average fiber length/number average fiber size) of less than 50.

Furthermore, in the present specification, the cellulose nanofiber (D2) is a cellulose nanofiber having a ratio of the number average fiber length to the number average fiber size (number average fiber length/number average fiber size) of 50 or greater.

Cellulose Nanocrystal (D1)

The cellulose nanocrystals (D1) can be produced by a known method. For example, the cellulose nanocrystals (D1) can be produced by treating a cellulose raw material with an acid such as sulfuric acid to hydrolyze and remove non-crystalline portions, followed by a mechanical defibrating treatment.

The cellulose raw material is not particularly limited as long as it contains cellulose, and examples thereof include various wood pulp, non-wood pulp, bacterial cellulose, regenerated cellulose, waste paper pulp, cotton, valonia cellulose, and hoya cellulose. Various commercially available cellulose powders, microcrystalline cellulose powders, and the like may also be used.

The mechanical defibrating treatment is also not particularly limited, and a method known in the related art can be used, for example, a method using an apparatus such as a high-pressure homogenizer, an ultrahigh-pressure homogenizer, a ball mill, a roll mill, a cutter mill, a planetary mill, a jet mill, an attritor, a grinder, a juicer mixer, a homomixer, an ultrasonic homogenizer, a nanogenizer, underwater counter collision, or a single-screw or double-screw extruder.

As the cellulose nanocrystals (D1), those having undergone various types of chemical modification can be used. Examples of the types of the chemical modification include esterification such as carboxymethylation, acylation, and phosphorylation, oxidation such as carboxylation, sulfonation, fluorination, cationization, and treatment with a silane coupling agent.

Of these, in a case where the cellulose nanocrystals are chemically modified cellulose nanocrystals, from the viewpoints of storage stability of the resulting coating composition, suppression of metallic color irregularities of the coating film to be formed, and the like, the type of the chemical modification is preferably sulfonation.

Furthermore, the cellulose nanocrystals (D1) may be subjected to the chemical modification after the defibration treatment.

The cellulose nanocrystals (D1) may be neutralized with a neutralizing agent. As the neutralizing agent, for example, the neutralizing agents described in the description of the water-dispersible hydroxyl group-containing acrylic resin (A11) can be used.

The cellulose nanocrystals (D1) have a number average fiber size preferably in a range from 1 to 50 nm, more preferably in a range from 1 to 30 nm, particularly preferably in a range from 1 to 15 nm, and more particularly preferably in a range from 1 to 5 nm, from the viewpoints of storage stability of the resulting coating composition, suppression of metallic color irregularities of the coating film to be formed, and the like.

Furthermore, the cellulose nanocrystals (D1) have a number average fiber length of preferably in a range from 10 to 500 nm, more preferably in a range from 10 to 300 nm, particularly preferably in a range from 20 to 250 nm, and more particularly preferably in a range from 30 to 150 nm, from the viewpoints of storage stability of the resulting coating composition, suppression of metallic color irregularities of the coating film to be formed, and the like.

The number average fiber size and the number average fiber length are measured and calculated, for example, from an image of a casted sample captured by transmission electron microscopy (TEM), the casted sample being prepared by dispersing a sample of cellulose nanocrystals (D1) diluted with water and casting the dispersed sample on a hydrophilized carbon film-coated grid. Specifically, the visual field for the observation is adjusted in a manner that at least 100 cellulose nanocrystal particles are observed, then sizes and fiber lengths of randomly chosen 100 cellulose nanocrystal particles are measured, and thus the number average size and the number average fiber length are calculated.

The ratio of the number average fiber length to the number average fiber size (number average fiber length/number average fiber size) of the cellulose nanocrystals (D1) is preferably 3 or greater and less than 50, more preferably 5 or greater and less than 50, and particularly preferably 10 or greater and less than 50, from the viewpoints of storage stability of the resulting coating composition, suppression of metallic color irregularities of the coating film to be formed, and the like.

In addition, examples of commercially available products of the cellulose nanocrystals (D1) include "Celluforce NCC" (available from Celluforce Inc., sodium sulfonate cellulose nanocrystals,).

Cellulose Nanofibers (D2)

The cellulose nanofibers (D2) can be produced by a known method. For example, cellulose nanofibers (D2) can be produced by subjecting a cellulose raw material to defibration treatment until the fiber size becomes fine and nano-sized. Examples of the defibration treatment method of the cellulose raw material include mechanical defibration treatment, and chemical treatment such as treatment by an oxidation catalyst solution containing an N-oxyl compound.

The cellulose raw material is not particularly limited as long as the cellulose raw material contains cellulose, and a cellulose raw material that is identical with the raw material of the cellulose nanocrystal (D1) described above can be used.

As the cellulose nanofibers (D2), those having undergone various types of chemical modification can be used. Examples of the types of the chemical modification include esterification such as carboxymethylation, acylation, and phosphorylation, oxidation such as carboxylation, sulfonation, fluorination, cationization, and treatment with a silane coupling agent.

Furthermore, the cellulose nanofibers (D2) may be neutralized with a neutralizing agent. As the neutralizing agent, for example, the neutralizing agents described in the description of the water-dispersible hydroxyl group-containing acrylic resin (A11) can be used.

The cellulose nanofibers (D2) have a number average fiber size preferably in a range from 1 to 500 nm, more preferably in a range from 1 to 250 nm, and particularly preferably in a range from 2 to 50 nm, from the viewpoints of storage stability of the resulting coating composition, suppression of metallic color irregularities of the coating film to be formed, and the like The cellulose nanofibers (D2) have a number average fiber length of preferably in a range from 200 to 10000 nm, more preferably in a range from 200 to 5000 nm, particularly preferably in a range from 200 to 2500 nm, and more particularly preferably in a range from 200 to 1000 nm, from the viewpoints of storage stability of the resulting coating composition, suppression of metallic color irregularities of the coating film to be formed, and the like.

The cellulose nanofibers (D2) have a ratio of the number average fiber length to the number average fiber size (number average fiber length/number average fiber size) of preferably in a range from 50 to 500, more preferably in a range from 50 to 200, and particularly preferably in a range from 50 to 150, from the viewpoints of storage stability of the resulting coating composition, suppression of metallic color irregularities of the coating film to be formed, and the like.

Examples of the commercially available product of the cellulose nanofibers (D2) include "NanoCellulose fiber" (available from Chuetsu Pulp & Paper Co., Ltd.), "BiNFi-s" (available from Sugino Machine Limited), "RHEOC-RYSTA" (available from DKS Co., Ltd.), "Cellulose nano-fiber" (available from Mori Machinery Corporation), "cellenpia" (available from Nippon Paper Industries Co., Ltd.), and "AUROVISCO" (available from Oji Holdings Corporation).

As the viscosity modifier (D), a viscosity modifier other than the cellulose nanocrystals (D1) and the cellulose nanofibers (D2) can be also used. A known viscosity modifier can be used as the viscosity modifier other than the cellulose nanocrystals (D1) and the cellulose nanofibers (D2), and examples of the viscosity modifier include a silica-based fine powder, a mineral-based viscosity modifier, a barium sulfate atomized powder, a polyamide-based viscosity modifier, an organic resin microparticle viscosity modifier, a diurea-based viscosity modifier, a urethane associative viscosity modifier, and a polyacrylic acid-based viscosity modifier that is acrylic swelling type.

Examples of the mineral-based viscosity modifier include swelling laminar silicate that has a 2:1 crystal structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; vermiculite; substitution products or derivatives thereof; and mixtures thereof.

As the urethane associative viscosity modifier, for example, use of a urethane associative viscosity modifier containing a hydrophobic group at a terminal and containing a urethane bond in a molecular chain is preferred. A commercially available product can be used as the urethane associative viscosity modifier. Examples of the trade name for such a commercially available product include "UH-420", "UH-462", "UH-472", "UH-540", "UH-752", "UH-756VF", and "UH-814N" (these are available from ADEKA Corporation), "SN-THICKENER 612", "SN-THICKENER 621N", "SN-THICKENER 625N", "SN-THICKENER 627N", and "SN-THICKENER 660T" (these are available from San Nopco Limited).

Examples of the polyacrylic acid-based viscosity modifier include sodium polyacrylate and polyacrylic acid-(meth) acrylic acid ester copolymers.

Examples of the commercially available product of the polyacrylic acid-based viscosity modifier include "Primal ASE-60", "Primal TT615", and "Primal RM5" (these are trade names) available from The Dow Chemical Company and "SN-THICKENER 613", "SN-THICKENER 618", "SN-THICKENER 630", "SN-THICKENER 634", and "SN-THICKENER 636" (these are trade names) available from San Nopco Limited. The acid value of the polyacrylic acid-based viscosity modifier is preferably in a range from 30 to 300 mg KOH/g, and more preferably in a range from 80 to 280 mg KOH/g.

In an embodiment of the present invention, from the viewpoints of storage stability of the resulting coating composition, suppression of metallic color irregularities of the coating film to be formed, and the like, the content of the viscosity modifier (D) is preferably in a range from 0.6 to 7 parts by mass, more preferably in a range from 1.0 to 5.0 parts by mass, and particularly preferably in a range from 1.5 to 4.5 parts by mass, based on 100 parts by mass of the resin solid content in the coating composition.

Furthermore, in an embodiment of the present invention, from the viewpoints of storage stability of the resulting coating composition, suppression of metallic color irregularities of the coating film to be formed, and the like, the content of the at least one viscosity modifier selected from the group consisting of a cellulose nanocrystal (D1) and a cellulose nanofiber (D2) is preferably in a range from 0.6 to 7 parts by mass, more preferably in a range from 1.0 to 5.0 parts by mass, and particularly preferably in a range from 1.5 to 4.5 parts by mass, based on 100 parts by mass of the resin solid content in the coating composition.

Organic Solvent (E) Having Solubility in Water at 20° C. of 4 Mass % or Greater

The coating composition of an embodiment of the present invention contains from 10 to 25 mass % of the organic solvent (E) having a solubility in water at 20° C. of 4 mass % or greater based on the amount of the volatile component in the coating composition. When the content of the organic solvent (E) having a solubility in water at 20° C. of 4 mass % or greater is not within the range described above, metallic color irregularities of the coating film to be formed tend to occur.

In particular, from the viewpoints of storage stability of the resulting coating composition, suppression of metallic color irregularities of the coating film to be formed, and the like, the content of the organic solvent (E) having a solubility in water at 20° C. of 4 mass % or greater is preferably in a range from 12 to 23 mass %, more preferably in a range from 13 to 22 mass %, and particularly preferably in a range from 14 to 21 mass %, based on the amount of the volatile component in the coating composition.

Note that, in the present specification, the "volatile component" refers to a component that is volatilized when dried at 110° C. for 1 hour. Thus, the amount of the volatile component in the coating composition can be calculated, for example, by weighing the coating composition into a heat-resistant container such as an aluminum foil cup, spreading the coating composition on the bottom surface of the container, then drying the coating composition at 110° C. for 1 hour, weighing the mass of the components remaining after drying, and subtracting the mass of the components remaining after drying from the total mass of the coating composition before drying.

Examples of the organic solvent (E) having a solubility in water at 20° C. of 4 mass % or greater include ester-based solvents such as ethyl acetate, ethylene glycol monomethyl ether acetate, diethylene glycol monobutyl ether acetate, 3-methoxybutyl acetate; ketone-based solvents such as acetone, methyl ethyl ketone, and cyclohexanone; alcohol-based solvents such as methanol, ethanol, isopropanol, n-butanol, sec-butanol, isobutanol, ethylene glycol monomethyl ether, ethylene glycol monoethyl ether, ethylene glycol monobutyl ether, ethylene glycol isopropyl ether, propylene glycol monomethyl ether, propylene glycol monobutyl ether, propylene glycol monopropyl ether, diethylene glycol monoethyl ether, diethylene glycol monobutyl ether, 3-methoxy-3-methyl-1-butanol, dipropylene glycol monomethyl ether, and dipropylene glycol-n-butyl ether; and ether-based solvents such as ethylene glycol dimethyl ether, diethylene glycol dimethyl ether, triethylene glycol dimethyl ether, tetraethylene glycol dimethyl ether, diethylene glycol methylethyl ether, diethylene glycol diethyl ether, diethylene glycol butylmethyl ether, and dioxane. These can be used alone or in combination of two or more types.

The organic solvent (E) having a solubility in water at 20° C. of 4 mass % or greater preferably contains an organic solvent (E1) having a solubility in water at 20° C. in a range from 4 to 10 mass %.

Examples of the organic solvent (E1) having a solubility in water at 20° C. in a range from 4 to 10 mass % include ester-based solvents such as ethyl acetate, diethylene glycol monobutyl ether acetate, and 3-methoxybutyl acetate; ketone-based solvents such as cyclohexanone; alcohol-based solvents such as n-butanol, sec-butanol, isobutanol, propylene glycol monobutyl ether, and dipropylene glycol-n-butyl ether; and ether-based solvents such as diethylene glycol butyl methyl ether. These can be used alone or in combination of two or more types.

In a case where the coating composition of an embodiment of the present invention contains the organic solvent (E1) having a solubility in water at 20° C. in a range from 4 to 10 mass %, from the viewpoints of storage stability of the resulting coating composition, suppression of irregularities of the coating film to be formed, and the like, the content of the organic solvent (E1) having a solubility in water at 20° C. in a range from 4 to 10 mass % is preferably in a range from 12 to 23 mass %, more preferably in a range from 13 to 22 mass %, and particularly preferably in a range from 14 to 21 mass %, based on the amount of the volatile component in the coating composition.

From the viewpoints of storage stability of the resulting coating composition, suppression of metallic color irregularities of the coating film to be formed, and the like, the organic solvent (E) having a solubility in water at 20° C. of 4 mass % or greater preferably contains propylene glycol monobutyl ether.

Additional Component

The coating composition of an embodiment of the present invention may optionally further contain, for example, a resin other than the hydroxyl group-containing resin (A) and the curing agent (B), a pigment other than the scale-shaped effect pigment (C), an organic solvent other than the organic solvent (E) having a solubility in water at 20° C. of 4 mass % or greater, a curing catalyst, a dispersant, an antisettling agent, a defoaming agent, an ultraviolet absorber, a light stabilizer, or a surface conditioner.

Examples of the resin other than the hydroxyl group-containing resin (A) and the curing agent (B) include an acrylic resin having no hydroxyl group, a polyester resin having no hydroxyl group, an acryl-modified polyester resin having no hydroxyl group, an acryl-modified polyurethane resin having no hydroxyl group, a polyurethane resin having no hydroxyl group, a polyether resin having no hydroxyl group, a polycarbonate resin having no hydroxyl group, an epoxy resin having no hydroxyl group, an alkyd resin having no hydroxyl group, and a polyolefin resin having no hydroxyl group. Among these, the coating composition of an embodiment of the present invention preferably contains a hydroxyl group-free polyurethane resin as at least one of the resin other than the hydroxyl group-containing resin (A) and the curing agent (B).

In a case where the coating composition of an embodiment of the present invention contains the hydroxyl group-free polyurethane resin, from the viewpoints of storage stability of the resulting coating composition, suppression of metallic color irregularities of coating film to be formed, and the like, the content of the polyurethane resin having no hydroxyl group is preferably in a range from 3 to 60 mass %, more preferably in a range from 5 to 40 mass %, and particularly preferably in a range from 7 to 30 mass %, based on the resin solid content in the coating composition.

Examples of the pigment other than the scale-shaped effect pigment (C) include color pigments and extender pigments. The pigments can each be used alone or in combination of two or more.

In a case where the coating composition of an embodiment of the present invention contains the pigment, a compounding amount of the pigment is preferably in a range from 1 to 200 parts by mass, more preferably in a range from 5 to 160 parts by mass, and particularly preferably in a range from 5 to 140 parts by mass, based on 100 parts by mass of the resin solid content in the coating composition.

Examples of the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, and diketopyrrolopyrrole-based pigments. Among them, titanium oxide and carbon black can be suitably used.

In a case where the coating composition contains the color pigment, a compounding amount of the color pigment is preferably in a range from 1 to 180 parts by mass, more preferably in a range from 5 to 150 parts by mass, and particularly preferably in a range from 15 to 130 parts by mass, based on 100 parts by mass of the resin solid content in the coating composition.

Furthermore, examples of the extender pigment include barium sulfate, talc, clay, kaolin, barium carbonate, calcium carbonate, silica, and alumina white. As the extender pigment, barium sulfate and talc can be suitably used from the viewpoints of coating material stability and smoothness.

In a case where the coating composition contains the extender pigment, a compounding amount of the extender pigment is preferably in a range from 1 to 180 parts by mass, more preferably in a range from 5 to 140 parts by mass, and particularly preferably in a range from 10 to 120 parts by mass, based on 100 parts by mass of the resin solid content in the coating composition.

Examples of the organic solvent other than the organic solvent (E) having a solubility in water at 20° C. of 4 mass % or greater include hydrocarbon-based solvents, such as mineral spirit, toluene, xylene, and solvent naphtha; alcohol-based solvents, such as 1-hexanol, 1-octanol, 2-octanol, 2-ethyl-1-hexanol, 1-decanol, benzyl alcohol, ethylene glycol monohexyl ether, and ethylene glycol mono(2-ethyl-hexyl) ether; ester-based solvents, such as n-butyl acetate, isobutyl acetate, methylamyl acetate, ethylene glycol monobutyl ether acetate, and n-butyl propionate; ether-based solvents, such as diethylene glycol dibutyl ether; and ketone-based solvents, such as methyl isobutyl ketone, 2-heptanone, ethyl n-amyl ketone, diisobutyl ketone, and isophorone. These resins can each be used alone, or two or more types of these resins can be combined and used.

Examples of the ultraviolet absorber include a benzotriazole-based absorber, a triazine-based absorber, a salicylic acid derivative-based absorber, and a benzophenone-based absorber.

Examples of the light stabilizer include a hindered amine-based light stabilizer.

Coating Composition

The coating composition of an embodiment of the present invention can be prepared by mixing the hydroxyl group-containing resin (A), the curing agent (B), the scale-shaped effect pigment (C), the viscosity modifier (D), and the organic solvent (E) having a solubility in water at 20° C. of 4 mass % or greater and, optionally, additional components in a solvent by an ordinary coating material-making means. For the solvent, for example, an organic solvent, water, or the like can be used.

Furthermore, from the viewpoints of storage stability of the resulting coating composition, suppression of metallic color irregularities of coating film to be formed, and the like, the solid content concentration of the coating composition of an embodiment of the present invention is preferably in a range from 10 to 45 mass %, more preferably in a range from 15 to 40 mass %, and particularly preferably in a range from 17 to 30 mass %.

The solid content concentration can be adjusted, for example, by regulating the amount of the solvent.

In particular, the coating composition of an embodiment of the present invention preferably contains water as a solvent from the viewpoint of storage stability and the like.

From the viewpoint of the storage stability and the like of the resulting coating composition, in a case where the coating composition of an embodiment of the present invention contains the water, the content of the water is preferably in a range from 30 to 80 mass %, more preferably in a range from 40 to 75 mass %, and particularly preferably in a range from 50 to 70 mass %, based on the total amount of the coating composition.

Furthermore, from the viewpoint of suppression of metallic color irregularities and the like of the coating film to be formed, the viscosity measured under conditions of a temperature of 25° C. and a shear rate of 1500 $sec^{-1}$ of the coating composition of an embodiment of the present invention is preferably in a range from 5 to 150 mPa·s, more preferably in a range from 7 to 125 mPa·s, and particularly preferably in a range from 10 to 100 mPa·s.

Furthermore, from the viewpoint of suppression of metallic color irregularities and the like of the coating film to be formed, the viscosity measured under conditions of a temperature of 25° C. and a shear rate of 0.1 $sec^{-1}$ of the coating composition of an embodiment of the present invention is preferably in a range from 5000 to 70000 mPa·s, more preferably in a range from 8000 to 60000 mPa·s, and particularly preferably in a range from 10000 to 50000 mPa·s.

The coating composition may be either a one-component coating material or a multi-component coating material, but is preferably a one-component coating material from the viewpoint of excellent productivity without a mixing process of coating materials, simplification of maintenance of a coating machine, and the like.

The coating composition can be applied onto an object to be coated by a method known per se, such as air spraying, air-less spraying, rotary atomization coating, or curtain coating. Electrostatic application may also be performed during the application. In particular, air spraying and rotary atomization coating are preferable. Such a coating method can be carried out once or several times until a desired film thickness is achieved.

The application amount of the coating composition is an application amount that makes the cured film thickness typically from 0.5 to 50 µm, preferably from 2 to 40 µm, and more preferably from 5 to 30 µm.

Method for Forming Multilayer Coating Film

The coating composition of an embodiment of the present invention can be used for forming a basecoat film in a case where a multilayer coating film including a basecoat film and a clearcoat film is formed on an object to be coated by a two-coating one-baking scheme. The method for forming the coating film in this case can be carried out according to the following method 1.

Method I

A method for forming a multilayer coating film including:

(I-1) applying a basecoat coating composition (Y) onto an object to be coated to form an uncured basecoat film;

(I-2) applying a clearcoat coating composition (Z) onto the uncured basecoat film to form an uncured clearcoat film; and (I-3) heating the uncured basecoat film and the uncured clearcoat film to simultaneously cure the uncured basecoat film and the uncured clearcoat film, where the basecoat coating composition (Y) is the coating composition of an embodiment of the present invention.

The object to be coated in the method I is preferably an automobile body on which an undercoat film is formed or an automobile body on which a colored coating film is formed on the undercoat film. The undercoat film is preferably formed by an electrodeposition coating material and more preferably formed by a cationic electrodeposition coating material. Furthermore, the uncured coating film contains a coating film in a set-to-touch state and a coating film in a dry-to-touch state.

In a case where the coating composition of an embodiment of the present invention is applied by the two-coating one-baking scheme of the method I, the coating film thickness in terms of the cured film thickness is preferably in a range from 0.5 to 50 µm, more preferably in a range from 2 to 40 µm, particularly preferably in a range from 5 to 30 µm, and more particularly preferably in a range from 8 to 27 µm.

Furthermore, the uncured basecoat film is formed by typically using one type of a basecoat coating composition but can be formed by using two or more types of basecoat coating compositions.

Note that, in a case where two or more types of the basecoat coating compositions are used, use of two types of the basecoat coating compositions is preferred.

Specifically, for example, after a first basecoat coating material that may use the coating composition of an embodiment of the present invention is applied onto the object to be coated to form a first basecoat film, a second basecoat coating material using the coating composition of an embodiment of the present invention is applied on the first basecoat film, and thus a second basecoat film can be formed.

In this case, from the viewpoint of suppression of metallic color irregularities of the coating film to be formed and the like, the cured film thickness of the first basecoat film is preferably in a range from 5 to 15 µm, and more preferably in a range from 7 to 13 µm, and the cured film thickness of the second basecoat film is preferably in a range from 0.5 to 15 µm, and more preferably in a range from 2 to 13 µm.

Furthermore, the coating film thickness, in terms of the cured film thickness, of the clearcoat coating composition (Z) is preferably in a range from 10 to 80 μm, and more preferably in a range from 15 to 60 μm.

Furthermore, in the method I, from the viewpoint of preventing occurrence of coating film failures such as popping, after the application of the coating composition of an embodiment of the present invention, preheating, air blowing, and the like are preferably performed under a heating condition that does not substantially cure the coating film. The temperature of preheating is preferably in a range from 40 to 100° C. more preferably in a range from 50 to 90° C., and particularly preferably in a range from 60 to 80° C. The time of preheating is preferably in a range from 30 seconds to 15 minutes, more preferably in a range from 1 to 10 minutes, and particularly preferably in a range from 2 to 5 minutes. In addition, the air blowing can be performed, for example, by blowing air of normal temperature or heated to a temperature of 25° C. to 80° C. on the coated surface of the coated object for 30 seconds to 15 minutes. Also, after the clearcoat coating composition (Y) has been applied, optionally, the clearcoat coating composition (Y) may be left at room temperature for an interval of 1 to 60 minutes, or the clearcoat coating composition (Y) may be preheated at a temperature of 40 to 80° C. for 1 to 60 minutes.

The curing of the coating film can be performed by the known heating means described above. The heating temperature is preferably in a range from 60 to 180° C., more preferably in a range from 65 to 170° C., and particularly preferably in a range from 70 to 160° C. The heating time is preferably in a range from 10 to 60 minutes and more preferably in a range from 20 to 40 minutes. By this heating, both of the basecoat film and the clearcoat film can be simultaneously cured.

Furthermore, the coating composition of an embodiment of the present invention can be suitably used for forming a basecoat film in a case where a multilayer coating film including a colored coating film, a basecoat film, and a clearcoat film is formed on an object to be coated, such as an automobile body, by a three-coating one-baking scheme. The method for forming the coating film in this case can be carried out according to the following method II.

Method II

A method for forming a multilayer coating film including:

(II-1) applying a colored coating composition (X) onto an object to be coated to form an uncured colored coating film;

(II-2) applying a basecoat coating composition (Y) onto the uncured colored coating film to form an uncured basecoat film;

(II-3) applying a clearcoat coating composition (Z) onto the uncured basecoat film to form an uncured clearcoat film; and (II-4) heating the uncured colored coating film, the uncured basecoat film, and the uncured clearcoat film to simultaneously cure the uncured colored coating film, the uncured basecoat film, and the uncured clearcoat film, where the basecoat coating composition (Y) is the coating composition of an embodiment of the present invention.

In the method II, the method for forming the coating film of the method I is performed on an uncured colored coating film. The object to be coated in the method 11 is preferably an automobile body on which an undercoat film is formed, and the like. The undercoat film is preferably formed by an electrodeposition coating material and more preferably formed by a cationic electrodeposition coating material.

In the method II, the coating film thickness, in terms of the cured film thickness, of the colored coating composition is preferably in a range from 10 to 60 μm, and more preferably in a range from 20 to 40 μm. Furthermore, the coating film thickness, in terms of the cured film thickness, of the coating composition of an embodiment of the present invention is preferably in a range from 0.5 to 50 μm, more preferably in a range from 2 to 40 μm, particularly preferably in a range from 5 to 30 μm, and more particularly preferably in a range from 8 to 27 μm. Furthermore, the coating film thickness, in terms of the cured film thickness, of the clearcoat coating composition (Z) is preferably in a range from 10 to 80 μm, and more preferably in a range from 15 to 60 μm.

Furthermore, in the method II, after application of the colored coating composition (X), preheating is preferably performed. The temperature of preheating is preferably in a range from 40 to 100° C., more preferably in a range from 50 to 90° C., and particularly preferably in a range from 60 to 80° C. The time of preheating is preferably in a range from 30 seconds to 15 minutes, more preferably in a range from 1 to 10 minutes, and particularly preferably in a range from 2 to 5 minutes.

Furthermore, after application of the coating composition of an embodiment of the present invention, preheating is preferably performed. The temperature of preheating is preferably in a range from 40 to 100° C., more preferably in a range from 50 to 90° C., and particularly preferably in a range from 60 to 80° C. The time of preheating is preferably in a range from 30 seconds to 15 minutes, more preferably in a range from 1 to 10 minutes, and particularly preferably in a range from 2 to 5 minutes.

Furthermore, also in the method II, the uncured basecoat film is formed by typically using one type of a basecoat coating composition but can be formed by using two or more types of basecoat coating compositions. In this case, the coating composition of an embodiment of the present invention can be used as a basecoat coating composition forming at least the outermost layer of the basecoat film.

Note that, in a case w % here two or more types of the basecoat coating compositions are used, use of two types of the basecoat coating compositions is preferred.

Specifically, for example, after a first basecoat coating material that may use the coating composition of an embodiment of the present invention is applied onto the object to be coated to form a first basecoat film, a second basecoat coating material using the coating composition of an embodiment of the present invention is applied on the first basecoat film, and thus a second basecoat film can be formed.

In this case, from the viewpoint of suppression of metallic color irregularities of the coating film to be formed and the like, the cured film thickness of the first basecoat film is preferably in a range from 5 to 15 μm, and more preferably in a range from 7 to 13 μm, and the cured film thickness of the second basecoat film is preferably in a range from 0.5 to 15 μm, and more preferably in a range from 2 to 13 μm.

After the clearcoat coating composition (Z) has been applied, optionally, the clearcoat coating composition (Z) may be left at room temperature for an interval of 1 to 60 minutes, or the clearcoat coating composition (Z) may be preheated at a temperature of 40 to 80° C. for 1 to 60 minutes.

The curing of the three-layered coating film of the uncured colored coating film, the uncured basecoat film, and the uncured clearcoat film can be performed by the known heating means described above. The heating temperature is preferably in a range from 60 to 180° C., more preferably in a range from 65 to 170° C., and particularly preferably in a range from 70 to 160° C. The heating time is preferably in a range from 10 to 60 minutes and particularly preferably in a range from 20 to 40 minutes. By this heating, the three-layered coating film of the colored coating film, the basecoat film, and the clearcoat film can be simultaneously cured.

As the clearcoat coating composition (Z) used in the methods I and II, it is possible to use any of thermosetting clearcoat coating compositions that are known for coating of automobile bodies. Examples thereof include organic solvent-type thermosetting coating compositions containing a base resin having a cross-linking functional group and a crosslinking agent: aqueous thermosetting coating compositions; and powder thermosetting coating compositions.

Examples of the cross-linking functional group contained in the base resin include a carboxyl group, a hydroxyl group, an epoxy group, and a silanol group. Examples of the type of base resin include acrylic resins, polyester resins, alkyd resins, urethane resins, epoxy resins, and fluororesins. Examples of the crosslinking agent include polyisocyanate compounds, blocked polyisocyanate compounds, melamine resins, urea resins, carboxyl group-containing compounds, carboxyl group-containing resins, epoxy group-containing resins, and epoxy group-containing compounds.

In addition, the clearcoat coating material may be a one-component coating material or a multi-component coating material, such as a two-component urethane resin coating material.

Furthermore, the clearcoat coating composition (Z) may optionally contain, in a range in which transparency is not interfered with, a color pigment, an effect pigment, a dye, or the like, and may further contain, as appropriate, an extender pigment, an ultraviolet absorber, a light stabilizer, an anti-foaming agent, a thickener, a rust inhibitor, a surface conditioner, and the like.

The combination of the base resin/crosslinking agent of the clearcoat coating composition (Z) is preferably a carboxyl group-containing resin/epoxy group-containing resin, a hydroxyl group-containing resin/polyisocyanate compound, a hydroxyl group-containing resin/blocked polyisocyanate compound, a hydroxyl group-containing resin/melamine resin, or the like. Among these, from the viewpoint of particle texture of the resulting coating film, a combination of hydroxyl group-containing resin/polyisocyanate compound is preferred.

As the colored coating composition used in the method II, any known thermosetting colored coating composition can be used. For example, a thermosetting coating composition containing a base resin containing a crosslinkable functional group, a crosslinking agent, a color pigment, and an extender pigment can be suitably used.

Examples of the crosslinkable functional group contained in the base resin include a carboxyl group, a hydroxyl group, and an epoxy group. Examples of the type of the base resin include an acrylic resin, a polyester resin, an alkyd resin, and a urethane resin. Examples of the crosslinking agent include a melamine resin, a polyisocyanate compound, and a blocked polyisocyanate compound.

As the colored coating composition, any of an organic solvent-type coating composition, an aqueous coating composition, or a powder coating composition may be used. Among these, a coating composition is preferably used.

The application in the methods I and II can be performed by a known method, such as air spraying, air-less spraying, or rotary atomization coating.

EXAMPLES

The present invention will be described more specifically below through production examples, examples and comparative examples. However, the present invention is not limited by these examples. In each example, "parts" and "%" are based on mass unless otherwise specified. In addition, the film thickness of the coating film is based on a cured coating film.

Production of Hydroxyl Group-Containing Acrylic Resin (A1)

Production Example 1

A reaction vessel equipped with a thermometer, a thermostat, a stirrer, a reflux condenser, a nitrogen introduction tube, and a dripping device was charged with 130 parts of deionized water and 0.52 parts of "AQUALON KH-10" (trade name, available from DKS Co. Ltd., an emulsifier having 97% of active ingredient). Then, the content was mixed by stirring in a nitrogen stream, and the temperature was raised to 80° C.

Then, 1.72 parts of monomer emulsion (1) described below and 5.3 parts of a 6% ammonium persulfate aqueous solution were introduced into the reaction vessel, and the reaction vessel was maintained at 80° C. for 15 minutes. The remaining monomer emulsion (1) was added dropwise over 3 hours into the reaction vessel maintained at the temperature specified above. After completion of the dropwise addition, the mixture was aged for 1 hour. Then, monomer emulsion (2) described below was added dropwise over 1 hour, and the mixture was aged for 1 hour. Next, while 20 parts of a 5% N-methylmorpholine aqueous solution was gradually added to the reaction vessel, the mixture was cooled to 30° C. The mixture was discharged while being filtered with a 100-mesh nylon cloth, and thus a hydroxyl group-containing acrylic resin (A1-1) aqueous dispersion having a solid content concentration of 30% was produced. The resulting hydroxyl group-containing acrylic resin (A1-1) had an acid value of 16 mg KOH/g, a hydroxyl value of 66 mg KOH/g, and a glass transition temperature of 21° C. Furthermore, the hydroxyl group-containing acrylic resin (A1-1) corresponds to the water-dispersible hydroxyl group-containing acrylic resin (A11) having a core/shell multilayer structure.

Monomer emulsion (1): produced by mixing and stirring 42 parts of deionized water, 0.72 parts of "AQUALON KH-10", 2 parts of methylenebisacrylamide, 5 parts of styrene, 15 parts of methyl methacrylate, 5 parts of 2-hydroxyethyl methacrylate, and 23 parts of n-butyl acrylate.

Monomer emulsion (2): produced by mixing and stirring 42 parts of deionized water, 0.72 parts of "AQUALON KH-10". 0.05 parts of ammonium persulfate, 2.5 parts of methacrylic acid, 10 parts of 2-hydroxyethyl methacrylate, 5 parts of styrene, 12.5 parts of methyl methacrylate, 10 parts of n-butyl acrylate, and 10 parts of n-butyl methacrylate.

Production Example 2

A reaction vessel equipped with a thermometer, a thermostat, a stirrer, a reflux condenser, a nitrogen introduction tube, and a dripping device was charged with 130 parts of deionized water and 0.52 parts of "AQUALON KH-10" (trade name, available from DKS Co. Ltd., an emulsifier having 97% of active ingredient). Then, the content was mixed by stirring in a nitrogen stream, and the temperature was raised to 80° C.

Then, 1.72 parts of monomer emulsion (1) described below and 5.3 parts of a 6% ammonium persulfate aqueous solution were introduced into the reaction vessel, and the reaction vessel was maintained at 80° C. for 15 minutes. Thereafter, 35.4 parts of the monomer emulsion (1) was added dropwise over 1 hour into the reaction vessel maintained at the temperature specified above. Immediately after the completion of the dropwise addition, 55.6 parts of the remaining monomer emulsion (1) was added dropwise to the reaction vessel. At the same time, 55.6 parts of the monomer emulsion (2) was added dropwise to the monomer emulsion (1), and the dropwise addition of the monomer emulsion (1) and the monomer emulsion (2) was completed over 2 hours. Then, 37.17 parts of the remaining monomer emulsion (2) was added dropwise to the reaction vessel over 1 hour, and the mixture was aged for 1 hour. Next, while 20 parts of a 5% N-methylmorpholine aqueous solution was gradually added to the reaction vessel, the mixture was cooled to 30° C. The mixture was then discharged while being filtered with a 100-mesh nylon cloth, and thus a hydroxyl group-containing acrylic resin (A1-2) aqueous dispersion having a solid content concentration of 30% was produced. The resulting hydroxyl group-containing acrylic resin (A1-2) had an acid value of 16 mg KOH/g, a hydroxyl value of 66 mg KOH/g, and a glass transition temperature of 21° C. The hydroxyl group-containing acrylic resin (A1-2) corresponds to the water-dispersible hydroxyl group-containing acrylic resin (A11') containing a gradient polymer layer.

> Monomer emulsion (1): produced by mixing and stirring 42 parts of deionized water, 0.72 parts of "AQUALON KH-10", 2 parts of methylenebisacrylamide, 5 parts of styrene, 15 parts of methyl methacrylate, 5 parts of 2-hydroxyethyl methacrylate, and 23 parts of n-butyl acrylate.

> Monomer emulsion (2): produced by mixing and stirring 42 parts of deionized water, 0.72 parts of "AQUALON KH-10", 0.05 parts of ammonium persulfate, 2.5 parts of methacrylic acid, 10 parts of 2-hydroxyethyl methacrylate, 5 parts of styrene, 12.5 parts of methyl methacrylate, 10 parts of n-butyl acrylate, and 10 parts of n-butyl methacrylate.

Production Example 3

A reaction vessel equipped with a thermometer, a thermostat, a stirrer, a reflux condenser, and a dropping device was charged with a mixed solvent of 27.5 parts of methoxypropanol and 27.5 parts of isobutanol, and heated to 110° C. Then, 121.5 parts of a mixture containing 25 parts of styrene, 27.5 parts of n-butyl methacrylate, 20 parts of "isostearyl acrylate" (trade name, available from Osaka Organic Chemical Industry Ltd., a branched higher alkyl acrylate), 7.5 parts of 4-hydroxybutyl acrylate, 15 parts of a phosphate group-containing polymerizable monomer described below, 12.5 parts of 2-methacryloyloxyethyl acid phosphate, 10 parts of isobutanol, and 4 parts of t-butyl peroxyoctanoate was added to the mixed solvent over 4 hours, and a mixture containing 0.5 parts of t-butyl peroxyoctanoate and 20 parts of isopropanol was further added dropwise over one hour. Subsequently, the resulting mixture was stirred and aged for one hour, and a solution of an acrylic resin (A1-3) containing a hydroxyl group and a phosphate group, which had a solid content concentration of 50%, was produced. The acid value due to the phosphate group of the resin was 83 mg KOH/g, the hydroxyl value was 29 mg KOH/g, and the weight average molecular weight was 10000.

A phosphate-containing polymerizable monomer: A reaction vessel equipped with a thermometer, a thermostat, a stirrer, a reflux condenser, and a dripping device was charged with 57.5 parts of monobutyl phosphate and 41 parts of isobutanol, and the temperature was raised to 90° C. Then, 42.5 parts of glycidyl methacrylate was added dropwise over 2 hours, and then the mixture was aged by stirring for another one hour. Subsequently, 59 parts of isopropanol were added, resulting in a phosphate group-containing polymerizable monomer solution having a solid content concentration of 500%. The acid value due to the phosphate group of the resulting monomer was 285 mg KOH/g.

Production of Hydroxyl Group-Containing Polyester Resin (A2)

Production Example 4

A reaction vessel equipped with a thermometer, a thermostat, a stirrer, a reflux condenser, and a water separator was charged with 174 parts of trimethylolpropane, 327 parts of neopentyl glycol, 352 parts of adipic acid, 109 parts of isophthalic acid, and 101 parts of 1,2-cyclohexane dicarboxylic anhydride, and the temperature was raised from 160° C. to 230° C. over 3 hours. Then, while the resulting condensed water was distilled off using the water separator, the temperature was maintained at 230° C., and the mixture was reacted until the acid value reached 3 mg KOH/g or less. To this reaction product, 59 parts of trimellitic anhydride was added, the mixture was subjected to an addition reaction at 170° C. for 30 minutes, after which the mixture was cooled to 50° C. or lower, and N-methylmorpholine was added in an amount equivalent to the amount of the acid groups to neutralize the mixture. Then, deionized water was gradually added, and thus a hydroxyl group-containing polyester resin (A2-1) solution having a solid content concentration of 45% and a pH of 7.2 was produced. The resulting hydroxyl group-containing polyester resin had a hydroxyl value of 128 mg KOH/g, an acid value of 35 mg KOH/g, and a weight average molecular weight of 13000.

Production of Hydroxyl Group-Containing Polyurethane Resin (A3)

Production Example 5

A reactor equipped with a thermometer, a stirrer, and a reflux condenser was charged with 316.0 parts of "PTMG 1000W" (trade name, available from Mitsubishi Chemical Corporation, polytetramethylene ether glycol having a number average molecular weight of 1000), 17.0 parts of 2,2-dimethylolpropionic acid, 21.9 parts of trimethylolpropane, 113.0 parts of isophorone diisocyanate, 0.19 parts of "NEO-STANN U-600" (trade name, Nitto Kasei Co., Ltd., bismuth-based catalyst) and 235.0 parts of methyl ethyl ketone, and the reaction system was purged with nitrogen gas. Then, the mixture was reacted at 80° C. with being stirred, and thus an NCO-terminated urethane prepolymer having a free isocyanate group content of 3.2% was produced. The resulting methyl ethyl ketone solution was cooled to 40° C. and emulsified by adding 764.5 g of deionized water containing 13.8 parts of N-methylmorpholine. Next, 96.4 parts of a 5% N-(2-hydroxyethyl)ethylenediamine aqueous solution was added to the emulsified solution, and stirring was performed for 120 minutes. The resulting product was then subjected to heating under reduced pressure to remove the methyl ethyl ketone by vaporization, and the concentration of the resulting product was adjusted with deionized water, and thus a hydroxyl group-containing polyurethane resin (A3-1) dispersion liquid having a solid content concentration of 35%, an acid value of 15 mg KOH/g, a hydroxyl value of 12 mg KOH/g, an average particle size of 120 nm, and a glass transition temperature of −7° C. was produced.

Production of Hydroxyl Group-Free Polyurethane Resin (U)

Production Example 6

A reactor equipped with a thermometer, a stirrer, and a reflux condenser was charged with 211.9 parts of "PTMG 1000" (trade name, available from Mitsubishi Chemical Corporation, polytetramethylene ether glycol having a number average molecular weight of 1000), 11.5 parts of 2,2-dimethylolpropionic acid, 6.9 parts of trimethylolpropane, 112.2 parts of isophorone diisocyanate, and 298.5 parts of methyl ethyl ketone, and the reaction system was purged with nitrogen gas. Then, the mixture was reacted at 80° C. with being stirred, and thus an NCO-terminated urethane prepolymer having a free isocyanate group content of 3.2% was produced. The resulting methyl ethyl ketone solution was cooled to 40° C. and emulsified by adding 493.2 g of deionized water containing 9.8 parts of N-ethylmorpholine. Next, 159.2 parts of a 5% ethylenediamine aqueous solution was added to the emulsified solution, and stirring was performed for 60 minutes. The resulting product was then subjected to heating under reduced pressure to remove the methyl ethyl ketone by vaporization, and the concentration of the resulting product was adjusted with deionized water, and thus a hydroxyl group-free polyurethane resin (U-1) dispersion liquid having a solid content concentration of 35%, an acid value of 14 mg KOH/g, and an average particle size of 120 nm was produced.

Production of Blocked Polyisocyanate Compound (B3)

Production Example 7

A reaction vessel equipped with a thermometer, a thermostat, a stirrer, a reflux condenser, a nitrogen introduction tube, and a dropping device was charged with 1650 parts of "Sumidur N-3300" (trade name, available from Sumika Bayer Urethane Co., Ltd., a polyisocyanate containing isocyanurate structure derived from hexamethylene diisocyanate, solid content concentration: 100%, isocyanate group content: 21.8%), 1100 parts of "PTMG2000" (trade name, available from Mitsubishi Chemical Corporation, a polytetramethylene ether glycol, average molecular weight: 2000, solid content concentration: 100%), and 0.9 parts of 2,6-di-t-butyl-4-methylphenol. The content was mixed well and heated at 130° C. for 3 hours under a nitrogen stream. Next, 1200 parts of ethyl acetate and 1200 parts of diisopropyl malonate were charged into the reaction vessel, 14 parts of a 28% methanol solution of sodium methoxide was added to the reaction vessel while the contents were being stirred under a nitrogen stream, and the contents in the reaction vessel were stirred at 65° C. for 8 hours. Next, the mixture was diluted with ethyl acetate to a final solid content concentration of 70%, and thus a blocked polyisocyanate compound (B3-1) having a solid content concentration of 70% and a weight average molecular weight of 40000 was produced.

Production of Pigment Dispersion Liquid

Production Example 8

In a stirring and mixing vessel, 25 parts (15 parts in terms of solid content) of "Hydroran 2156" (trade name, available from Eckart GmbH, a silica-coated aluminum pigment paste, aluminum content of 60%), 10 parts (5 parts in terms of solid content) of the solution of the acrylic resin (A1-3) having a hydroxyl group and a phosphate group and produced in Production Example 3, 8 parts of propylene glycol monomethyl ether, 3 parts of ethylene glycol monobutyl ether, 3 parts of dipropylene glycol monomethyl ether, and 40 parts of propylene glycol monobutyl ether were homogeneously mixed, and thus a pigment dispersion liquid (P-1) was produced.

Production Examples 9 to 28

Each of pigment dispersion liquids (P-2) to (P-21) was produced in the same manner as in Production Example 8 except that the formulation composition was changed to the formulation composition shown in Table 1 below.

In Table 1, for the organic solvent, the addition amount is described, and for components other than the organic solvent, the solid content is described. The components shown in Table 1 are as follows.

TABLE 1

| | | | Production Examples | | 8 | 9 | 10 | 11 | 12 | 13 | 14 | 15 |
|---|---|---|---|---|---|---|---|---|---|---|---|---|
| Scale-shaped effect pigment dispersion liquid | Pigment dispersion liquid name | | | | P-1 | P-2 | P-3 | P-4 | P-5 | P-6 | P-7 | P-8 |
| | Scale-shaped effect pigment (C) | Scale-shaped aluminum pigment (C1) | Silica-coated scale-shaped aluminum pigment (C11) | "Hydroran 2156" | 15 | 15 | 15 | 15 | 15 | 15 | 15 | 15 |
| | | | "Alpaste 6360NS" (Note 1) | | | | | | | | | |
| | | Scale-shaped light interference pigment (C2) | "Xirallic T61-10 Micro Silver" (Note 2) | | | | | | | | | |
| | | | "Iriodin 121 Rutile Lustre Satin" (Note 3) | | | | | | | | | |
| | Hydroxyl group-containing resin (A) | Hydroxyl group-containing acrylic resin (A1) | Acrylic resin (A1-3) having a hydroxyl group and a phosphate group | | 5 | 5 | 5 | 5 | 5 | 5 | 5 | 5 |
| | Organic solvent | Organic solvent (E) having a solubility in water at 20° C. of 4 mass % or greater | Organic solvent (E1) having a solubility in water at 20° C. of 4 to 10 mass % | Propylene glycol monobutyl ether | 40 | | | | | | 54 | 22 | 22 |
| | | | | n-Butanol | | | | | 54 | | | |

TABLE 1-continued

| | | | | | | | | |
|---|---|---|---|---|---|---|---|---|
| | | Propylene glycol monomethyl ether | 8 | 54 | | | | 8 | 8 |
| | | Ethylene glycol monobutyl ether | 3 | | 54 | | | 3 | 3 |
| | | Dipropylene glycol monomethyl ether | 3 | | | 54 | | 3 | 3 |
| Organic solvent having a solubility in water at 20° C. of less than 4 mass % | Butyl acetate | | | | | | 18 | |
| | 2-Ethyl-1-hexanol | | | | | | | 18 |
| | Methyl isobutyl ketone | | | | | | | |
| | "Swasol 1000" (Note 4) | | | | | | | |

| Production Examples | | | | | 16 | 17 | 18 | 19 | 20 | 21 | 22 |
|---|---|---|---|---|---|---|---|---|---|---|---|
| Scale-shaped effect pigment dispersion liquid | Scale-shaped effect pigment (C) | Scale-shaped aluminum pigment (C1) | Silica-coated scale-shaped aluminum pigment (C11) "Hydroran 2156" | Pigment dispersion liquid name → | P-9 | P-10 | P-11 | P-12 | P-13 | P-14 | P-15 |
| | | | | | 15 | 40 | 25 | 5 | | | |
| | | Scale-shaped light interference pigment (C2) | "Alpaste 6360NS" (Note 1) | | | | | | 15 | | |
| | | | "Xirallic T61-10 Micro Silver" (Note 2) | | | | | | | 15 | |
| | | | "Iriodin 121 Rutile Lustre Satin" (Note 3) | | | | | | | | 15 |
| | Hydroxyl group-containing resin (A) | Hydroxyl group-containing acrylic resin (A1) | Acrylic resin (A1-3) having a hydroxyl group and a phosphate group | | 5 | 5 | 5 | 5 | 5 | 5 | 5 |
| | Organic solvent | Organic solvent (E) having a solubility in water at 20° C. of 4 mass % or greater | Organic solvent (E1) having a solubility in water at 20° C. of 4 to 10 mass % / Propylene glycol monobutyl ether / n-Butanol | | 58 | 40 | 40 | 40 | 40 | 40 | 40 |
| | | | Propylene glycol monomethyl ether | | 8 | 8 | 8 | 8 | 8 | 8 | 8 |
| | | | Ethylene glycol monobutyl ether | | 3 | 3 | 3 | 3 | 3 | 3 | 3 |
| | | | Dipropylene glycol monomethyl ether | | 3 | 3 | 3 | 3 | 3 | 3 | 3 |
| | | Organic solvent having a solubility in water at 20° C. of less than 4 mass % | Butyl acetate | | | | | | | | |
| | | | 2-Ethyl-1-hexanol | | | | | | | | |
| | | | Methyl isobutyl ketone | | | | | | | | |
| | | | "Swasol 1000" (Note 4) | | | | | | | | |

| Production Examples | | | | 23 | 24 | 25 | 26 | 27 | 28 |
|---|---|---|---|---|---|---|---|---|---|
| Scale-shaped effect pigment dispersion liquid | Scale-shaped effect pigment (C) | Scale-shaped aluminum pigment (C1) | Pigment dispersion liquid name → | P-16 | P-17 | P-18 | P-19 | P-20 | P-21 |
| | | | Silica-coated scale-shaped aluminum pigment (C11) "Hydroran 2156" | 15 | 15 | 15 | 15 | 15 | 15 |
| | | Scale-shaped light interference pigment (C2) | "Alpaste 6360NS" (Note 1) | | | | | | |
| | | | "Xirallic T61-10 Micro Silver" (Note 2) | | | | | | |
| | | | "Iriodin 121 Rutile Lustre Satin" (Note 3) | | | | | | |
| | Hydroxyl group-containing resin (A) | Hydroxyl group-containing acrylic resin (A1) | Acrylic resin (A1-3) having a hydroxyl group and a phosphate group | 5 | 5 | 5 | 5 | 5 | 5 |
| | Organic solvent | Organic solvent (E) having a solubility in water at 20° C. of 4 mass % or greater | Organic solvent (E1) having a solubility in water at 20° C. of 4 to 10 mass % / Propylene glycol monobutyl ether / n-Butanol | 13 | 13 | 13 | 13 | | 70 |
| | | | Propylene glycol monomethyl ether | 8 | 8 | 8 | 8 | | 8 |
| | | | Ethylene glycol monobutyl ether | 3 | 3 | 3 | 3 | | 3 |
| | | | Dipropylene glycol monomethyl ether | 3 | 3 | 3 | 3 | | 3 |
| | | Organic solvent having a solubility in water at 20° C. of less than 4 mass % | Butyl acetate | 27 | | | | 18 | |
| | | | 2-Ethyl-1-hexanol | | 27 | | | 18 | |
| | | | Methyl isobutyl ketone | | | 27 | | 18 | |
| | | | "Swasol 1000" (Note 4) | | | | 27 | | |

(Note 1)
"Alpaste 6360NS": trade name, available from Toyo Aluminum K. K., aluminum pigment paste
(Note 2)
"Xirallic T61-10 Micro Silver": trade name, available from Merck, titanium oxide-coated alumina flake pigment
(Note 3)
"Iriodin 121 Rutile Lustre Satin": trade name, available from Merck, titanium oxide-coated mica pigment
(Note 4)
"Swasol 1000": trade name, available from Maruzen Petrochemical Co., Ltd., hydrocarbon-based solvent
Furthermore, the solubility in water at 20° C. of each of the organic solvents is as follows.
Propylene glycol monobutyl ether: solubility in water at 20° C. was 6.4 mass %
n-Butanol: solubility in water at 20° C. was 6.4 mass %
Propylene glycol monomethyl ether: freely mixed in water at 20° C.
Ethylene glycol monobutyl ether: freely mixed in water at 20° C.
Dipropylene glycol monomethyl ether: freely mixed in water at 20° C.
Butyl acetate: solubility in water at 20° C. was 1.0 mass %
2-Ethyl-1-hexanol: solubility in water at 20° C. was 0.07 mass %
Methyl isobutyl ketone: insoluble in water at 20° C.
"Swasol 1000": insoluble in water at 20° C.

Production of Cellulose Nanocrystal (D1) Aqueous Dispersion

Production Example 29

In a deionized water stirred by a magnetic stirrer, "Celluforce NCC" (trade name, available from Celluforce Inc.; sodium sulfonate cellulose nanocrystal having a number average fiber size of 2.3 to 4.5 nm, a number average fiber length of 44 to 108 nm, a specific surface area of 400 $m^2$/g, and a zeta potential of −37 mV; solid content concentration: 100%) was gradually added in a manner that the solid content concentration became 4%, the stirring was then continued for 2 hours, and thus a cellulose nanocrystal (D1-1) aqueous dispersion was produced.

Preparation of Coating Composition

Example 1

In a stirring and mixing vessel, 89.0 parts (20.0 parts in terms of solid content) of the pigment dispersion liquid (P-1) produced in Production Example 8, 133.3 parts (40.0 parts in terms of solid content) of the hydroxyl group-containing acrylic resin (A1-1) aqueous dispersion produced in Production Example 1, 55.6 parts (25 parts in terms of solid content) of the hydroxyl group-containing polyester resin solution (A2-1) produced in Production Example 4, 28.6 parts (10 parts in terms of solid content) of the dispersion liquid of the hydroxyl group-free polyurethane resin (U-1) produced in Production Example 6, 6.25 parts (5.0 parts in terms of solid content) "CYMEL 325" (trade name, available from Allnex Japan Inc., methyl/butyl mixed etherified melamine resin, solid content concentration: 80%), and 39.5 parts (15.0 parts in terms of solid content) of "Bayhydur VP LS 2310" (trade name, Sumika Bayer Urethane Co., Ltd., blocked polyisocyanate compound, solid content concentration: 38%) were homogeneously mixed, then 75.0 parts (3.0 parts z in terms of solid content) of the cellulose nanocrystal (D1-1) aqueous dispersion liquid produced in Production Example 29, 2-(dimethylamino)ethanol, and deionized water were added, and thus an aqueous coating composition No. 1 having a pH of 8.0 and a solid content concentration of 25% was produced.

Examples 2 to 25 and Comparative Examples 1 to 8

Aqueous coating compositions No. 1 to No. 33 were produced in the same manner as in Example 1 except that formulations of the components were changed to the formulations shown in the following Table 2.

In Table 2, for the organic solvent, the addition amount is described, and for components other than the organic solvent, the solid content is described. The components shown in Table 2 are as follows.

(Note 5) "RHEOCRYSTA I-2SX": trade name, available from DKS Co., Ltd., cellulose nanofibers, viscosity modifier (Note 6) "PRIMAL ASE-60"; trade name, available from The Dow Chemical Company, polyacrylic acid-based viscosity modifier (Note 7) "UH-752": trade name, available from ADEKA Corporation, urethane associative viscosity modifier Using the coating compositions No. 1 to No. 33 produced in Examples 1 to 25 and Comparative Examples 1 to 8 described above, evaluation was performed by the following test methods. The evaluation results are presented in Table 2 below.

Test Methods

Storage Stability

For the coating composition produced in each of Examples and Comparative Examples, a storage stability test was performed in accordance with the following test method.

800 g of each of the coating compositions described above was charged in a glass bottle having a volume of approximately 1 L and stored in a thermostatic chamber at 40° C. for 10 days. Thereafter, the temperature of the coating composition was returned to room temperature, the state of the contents in the container was visually observed, and thus the storage stability was evaluated based on the following criteria. A and B are acceptable. Results are listed in Table 2.

A: No occurrence of precipitation and no change in viscosity were observed.

B: Slight occurrence of precipitation and/or change in viscosity was observed but the state returned to the original state by agitation.

C: Occurrence of precipitation and/or change in viscosity was observed.

D: Remarkable occurrence of precipitation and/or remarkable change in viscosity was observed.

Preparation of Test Sheet Under Heating and Curing Condition at 80° C. and Evaluation of Metallic Color Irregularities "Elecron GT-10" (trade name, available from Kansai Paint Co., Ltd., cationic electrodeposition paint) was applied by electrodeposition onto an alloying molten zinc plating steel sheet chemically treated with zinc phosphate as a metal material to have a cured film thickness of 20 μm, the coated steel sheet was heated at 170° C. for 30 minutes to cure the electrodeposited coating film, and thus an electrodeposition-coated steel sheet was produced. Then, on the resulting electrodeposition-coated steel sheet, the colored coating composition (trade name "WP-505T", available from Kansai Paint Co., Ltd., polyester resin-amino resin-based aqueous coating composition) was applied in a manner that the film thickness became 20 μm, then allowed to stand for 2 minutes, and subjected to preheating at 80° C. for 3 minutes, and thus an uncured colored coating film was produced. Then, each of the coating compositions produced in Examples and Comparative Examples described above was applied onto the uncured colored coating film in a manner that the cured film thickness became 15 μm, and the coated sheet was allowed to stand for 3 minutes, and then preheated at 80° C. for 3 minutes. Thus, an uncured basecoat film was produced. Then, "KINO6510" (trade name, available from Kansai Paint Co., Ltd., an acrylic resin-polyisocyanate compound-based solvent-type topcoat clear coating material) was electrostatically applied onto the uncured basecoat film to give a cured film thickness of 35 μm, and thus an uncured clearcoat film was produced. Then, after being left to stand for 7 minutes, the coated sheet was heated at 80° C. for 30 minutes to cure the multilayer coating film including the uncured colored coating film, the uncured basecoat film, and the uncured clearcoat film, and thus a test sheet was produced.

Each of the test sheets was visually observed, and the degree of occurrence of metallic color irregularities was evaluated based on the following criteria. A and B are acceptable. Results are listed in Table 2.

A: No occurrence of metallic color irregularities was observed.

B: Slight occurrence of metallic color irregularities was observed but at acceptable degree.

C: Occurrence of metallic color irregularities was observed.

D: Occurrence of a large amount of metallic color irregularities was observed.

Preparation of Test Sheet Under Heating and Curing Condition at 140° C. and Evaluation of Metallic Color Irregularities "Elecron GT-10" (trade name, available from Kansai Paint Co., Ltd., cationic electrodeposition paint) was applied by electrodeposition onto an alloying molten zinc plating steel sheet chemically treated with zinc phosphate as a metal material to have a cured film thickness of 20 μm, the coated steel sheet was heated at 170° C. for 30 minutes to cure the electrodeposited coating film, and thus an electrodeposition-coated steel sheet was produced. Then, on the resulting electrodeposition-coated steel sheet, the colored coating composition (trade name "WP-505T", available from Kansai Paint Co., Ltd., polyester resin-amino resin-based aqueous coating composition) was applied in a manner that the film thickness became 20 μm, then allowed to stand for 2 minutes, and subjected to preheating at 80° C. for 3 minutes, and thus an uncured colored coating film was produced. Then, each of the coating compositions produced in Examples and Comparative Examples described above was applied onto the uncured colored coating film in a manner that the cured film thickness became 15 μm, and the coated sheet was allowed to stand for 3 minutes, and then preheated at 80° C. for 3 minutes. Thus, an uncured basecoat film was produced. Then, "KINO6510" (trade name, available from Kansai Paint Co., Ltd., an acrylic resin-polyisocyanate compound-based solvent-type topcoat clear coating material) was electrostatically applied onto the uncured basecoat film to give a cured film thickness of 35 μm, and thus an uncured clearcoat film was produced. Then, after being left to stand for 7 minutes, the coated sheet was heated at 140° C. for 30 minutes to cure the multilayer coating film including the uncured colored coating film, the uncured basecoat film, and the uncured clearcoat film, and thus a test sheet was produced.

Each of the test sheets was visually observed, and the degree of occurrence of metallic color irregularities was evaluated based on the following criteria. A and B are acceptable. Results are listed in Table 2.

A: No occurrence of metallic color irregularities was observed.

B: Slight occurrence of metallic color irregularities was observed but at acceptable degree.

C: Occurrence of metallic color irregularities was observed.

D: Occurrence of a large amount of metallic color irregularities was observed.

TABLE 2

| | | | | | | Examples | | | | | |
| --- | --- | --- | --- | --- | --- | --- | --- | --- | --- | --- | --- |
| | | | | | | 1 | 2 | 3 | 4 | 5 | 6 |
| | | Coating Composition No. | | | | 1 | 2 | 3 | 4 | 5 | 6 |
| | | Pigment dispersion liquid name | | | | P-1 | P-1 | P-1 | P-1 | P-1 | P-1 |
| Scale-shaped effect pigment dispersion liquid | Scale-shaped effect pigment (C) | Scale-shaped aluminum pigment (C1) | Silica-coated scale-shaped aluminum pigment (C11) | "Hydrogen 2156" | 15 | 15 | 15 | 15 | 15 | 15 |
| | | | "Alpaste 6360NS" (Note 1) | | | | | | | |
| | | Scale-shaped light interference pigment (C2) | "Xirallic T61-10 Micro Silver" (Note 2) | | | | | | | |
| | | | "Iriodin 121 Rutile Lustre Satin" (Note 3) | | | | | | | |
| | Hydroxyl group-containing resin (A) | Hydroxyl group-containing acrylic resin (A1) | Acrylic resin (A1-3) having a hydroxyl group and a phosphate group | | 5 | 5 | 5 | 5 | 5 | 5 |
| | Organic solvent | Organic solvent (E) having a solubility in water at 20° C. of 4 mass % or greater | Organic solvent (E1) having a solubility in water at 20° C. of 4 to 10 mass % | Propylene glycol monobutyl ether n-Butanol | 40 | 40 | 40 | 40 | 40 | 40 |
| | | | Propylene glycol monomethyl ether | | 8 | 8 | 8 | 8 | 8 | 8 |
| | | | Ethylene glycol monobutyl ether | | 3 | 3 | 3 | 3 | 3 | 3 |
| | | | Dipropylene glycol monomethyl ether | | 3 | 3 | 3 | 3 | 3 | 3 |
| | | Organic solvent having a solubility in water at 20° C. of less than 4 mass % | Butyl acetate | | | | | | | |
| | | | 2-Ethyl-1-hexanol | | | | | | | |
| | | | Methyl isobutyl ketone | | | | | | | |
| | | | "Swasol 1000" (Note 4) | | | | | | | |

TABLE 2-continued

| Hydroxyl group-containing resin (A) | Hydroxyl group-containing acrylic resin (A1) | Water-dispersible hydroxyl group-containing acrylic resin (A11) | Hydroxyl group-containing acrylic resin (A1-1) | | | | | | |
|---|---|---|---|---|---|---|---|---|---|
| | | | Water-dispersible hydroxyl group-containing acrylic resin (A1-1) | | 40 | 40 | | 40 | | 40 |
| | | Water-dispersible hydroxyl group-containing acrylic resin (A11') containing a gradient polymer layer | Hydroxyl group-containing acrylic resin (A1-2) | | | | 40 | | 40 | |
| | Hydroxyl group-containing polyester resin (A2-1) | | | | 25 | 25 | 25 | 25 | 25 | 25 |
| | Hydroxyl group-containing polyurethane resin (A3-1) | | | | | | | | | 10 |
| Curing agent (B) | Amino resin (B1) | "CYMEL 325" | | | 5 | | 5 | 5 | 5 | 5 |
| | Blocked polyisocyanate compound (B3) | "VP LS 2310" | | | 15 | 20 | 15 | | | 15 |
| | | Blocked polyisocyanate compound (B3-1) | | | | | | 15 | 15 | |
| Viscosity modifier (D) | Cellulose nanocrystal (D1) | "CellForce NCC" | | | 3 | 3 | 3 | 3 | 3 | 3 |
| | Cellulose nanofibers (D2) | "RHEOCRYSTA I-2SX" (Note 5) | | | | | | | | |
| | "Primal ASE-60" (Note 6) | | | | | | | | | |
| | "UH-752" (Note 7) | | | | | | | | | |
| Additional resin | Hydroxyl group-free polyurethane resin (U-1) | | | | 10 | 10 | 10 | 10 | 10 | |
| Content of water in coating composition [part by mass] | | | | | 246 | 246 | 246 | 246 | 246 | 246 |
| Coating material solid content concentration [%] | | | | | 25 | 25 | 25 | 25 | 25 | 25 |
| Content of organic solvent (E) having a solubility in water at 20° C. of 4 mass % or greater in coating composition [part by mass] | | | | | 54 | 54 | 54 | 54 | 54 | 54 |
| Content of volatile component in coating composition [part by mass] | | | | | 300 | 300 | 300 | 300 | 300 | 300 |
| Content proportion of organic solvent (E) having a solubility in water at 20° C. of 4 mass % or greater based on volatile component in coating composition [%] | | | | | 18 | 18 | 18 | 18 | 18 | 18 |
| Evaluation | Metallic color irregularities under heating and curing condition at 80° C. | | | | A | A | A | A | A | A |
| | Metallic color irregularities under heating and curing condition at 140° C. | | | | A | A | A | A | A | A |
| | Storage stability | | | | A | A | A | A | A | A |

| | | | | | Examples | | | | | |
|---|---|---|---|---|---|---|---|---|---|---|
| | | | | | 7 | 8 | 9 | 10 | 11 | 12 |
| Coating Composition No. | | | | | 7 | 8 | 9 | 10 | 11 | 12 |
| Scale-shaped effect pigment dispersion liquid | Pigment dispersion liquid name | | | | P-2 | P-3 | P-4 | P-5 | P-6 | P-7 |
| | Scale-shaped effect pigment (C) | Scale-shaped aluminum pigment (C1) | Silica-coated scale-shaped aluminum pigment (C11) "Alpaste 6360NS" (Note 1) | "Hydroran 2156" | 15 | 15 | 15 | 15 | 15 | 15 |
| | | Scale-shaped light interference pigment (C2) | "Xirallic T61-10 Micro Silver" (Note 2) | | | | | | | |
| | | | "Iriodin 121 Rutile Lustre Satin" (Note 3) | | | | | | | |
| | Hydroxyl group-containing resin (A) | Hydroxyl group-containing acrylic resin (A1) | Acrylic resin (A1-3) having a hydroxyl group and a phosphate group | | 5 | 5 | 5 | 5 | 5 | 5 |
| | Organic solvent | Organic solvent (E) having a solubility in water at 20° C. of 4 mass % or greater | Organic solvent (E1) having a solubility in water at 20° C. of 4 to 10 mass % | Propylene glycol monobutyl ether | | | | | 54 | 22 |
| | | | | n-Butanol | | | | 54 | | |
| | | | Propylene glycol monomethyl ether | | 54 | | | | | 8 |
| | | | Ethylene glycol monobutyl ether | | | 54 | | | | 3 |
| | | | Dipropylene glycol monomethyl ether | | | | 54 | | | 3 |
| | | | Butyl acetate | | | | | | | 18 |
| | | Organic solvent having a solubility in water at 20° C. of less than 4 mass % | 2-Ethyl-1-hexanol | | | | | | | |
| | | | Methyl isobutyl ketone | | | | | | | |
| | | | "Swasol 1000" (Note 4) | | | | | | | |

53  54

TABLE 2-continued

| | | | | | | | | | | | |
|---|---|---|---|---|---|---|---|---|---|---|---|
| Hydroxyl group-containing resin (A) | Hydroxyl group-containing acrylic resin (A1) | Water-dispersible hydroxyl group-containing acrylic resin (A11) | Hydroxyl group-containing acrylic resin (A1-1) | | 40 | 40 | 40 | 40 | 40 | 40 |
| | | | Water-dispersible hydroxyl group-containing acrylic resin (A11') containing a gradient polymer layer | Hydroxyl group-containing acrylic resin (A1-2) | | | | | | |
| | | Hydroxyl group-containing polyester resin (A2-1) | | | 25 | 25 | 25 | 25 | 25 | 25 |
| | | Hydroxyl group-containing polyurethane resin (A3-1) | | | | | | | | |
| Curing agent (B) | Amino resin (B1) | "CYMEL 325" | | | 5 | 5 | 5 | 5 | 5 | 5 |
| | Blocked polyisocyanate compound (B3) | "VP LS 2310" Blocked polyisocyanate compound (B3-1) | | | 15 | 15 | 15 | 15 | 15 | 15 |
| Viscosity modifier (D) | Cellulose nanocrystal (D1) | "CellForce NOC" | | | 3 | 3 | 3 | 3 | 3 | 3 |
| | Cellulose nanofibers (D2) | "RHEOCRYSTA I-2SX" (Note 5) | | | | | | | | |
| | "Primal ASE-60" (Note 6) | | | | | | | | | |
| | "UH-752" (Note 7) | | | | | | | | | |
| Additional resin | Hydroxyl group-free polyurethane resin (U-1) | | | | 10 | 10 | 10 | 10 | 10 | 10 |
| Content of water in coating composition [part by mass] | | | | | 246 | 246 | 246 | 246 | 246 | 246 |
| Coating material solid content concentration [%] | | | | | 25 | 25 | 25 | 25 | 25 | 25 |
| Content of organic solvent (E) having a solubility in water at 20° C. of 4 mass % or greater in coating composition [part by mass] | | | | | 54 | 54 | 54 | 54 | 54 | 36 |
| Content of volatile component in coating composition [part by mass] | | | | | 300 | 300 | 300 | 300 | 300 | 300 |
| Content proportion of organic solvent (E) having a solubility in water at 20° C. of 4 mass % or greater based on volatile component in coating composition [%] | | | | | 18 | 18 | 18 | 18 | 18 | 12 |
| Evaluation | Metallic color irregularities under heating and curing condition at 80° C. | | | | A | A | A | A | A | B |
| | Metallic color irregularities under heating and curing condition at 140° C. | | | | A | A | A | A | A | B |
| | Storage stability | | | | B | B | B | A | A | A |

| | | | | | Examples | | | | | | |
|---|---|---|---|---|---|---|---|---|---|---|---|
| | | | | | 13 | 14 | 15 | 16 | 17 | 18 | 19 |
| | | | Coating Composition No. | | 13 | 14 | 15 | 16 | 17 | 18 | 19 |
| | | | Pigment dispersion liquid name | | P-8 | P-9 | P-1 | P-1 | P-1 | P-1 | P-1 |
| Scale-shaped effect pigment dispersion liquid | Scale-shaped effect pigment (C) | Scale-shaped aluminum pigment (C1) | Silica-coated scale-shaped aluminum pigment (C11) | "Hydroran 2156" | 15 | 15 | 15 | 15 | 15 | 15 | 15 |
| | | | "Alpaste 6360NS" (Note 1) | | | | | | | | |
| | | | "Xirallic T61-10 Micro Silver" (Note 2) | | | | | | | | |
| | | Scale-shaped light interference pigment (C2) | "Iriodin 121 Rutile Lustre Satin" (Note 3) | | | | | | | | |
| | Hydroxyl group-containing resin (A) | Hydroxyl group-containing acrylic resin (A1) | Acrylic resin (A1-3) having a hydroxyl group and a phosphate group | | 5 | 5 | 5 | 5 | 5 | 5 | 5 |
| | Organic solvent | Organic solvent (E) having a solubility in water at 20° C. of 4 mass % or greater | Organic solvent (E1) having a solubility in water at 20° C. of 4 to 10 mass % | Propylene glycol monobutyl ether n-Butanol | 22 | 58 | 40 | 40 | 40 | 40 | 40 |
| | | | Propylene glycol monomethyl ether | | 8 | 8 | 8 | 8 | 8 | 8 | 8 |
| | | | Ethylene glycol monobutyl ether | | 3 | 3 | 3 | 3 | 3 | 3 | 3 |
| | | | Dipropylene glycol monomethyl ether | | 3 | 3 | 3 | 3 | 3 | 3 | 3 |
| | | Organic solvent having a solubility in water at 20° C. of less than 4 mass % | Butyl acetate | | | | | | | | |
| | | | 2-Ethyl-1-hexanol | | 18 | | | | | | |
| | | | Methyl isobutyl ketone | | | | | | | | |
| | | | "Swasol 1000" (Note 4) | | | | | | | | |

TABLE 2-continued

| | | | | | | | | | | |
|---|---|---|---|---|---|---|---|---|---|---|
| Hydroxyl group-containing resin (A) | Hydroxyl group-containing acrylic resin (A1) | Water-dispersible hydroxyl group-containing acrylic resin (A11); Water-dispersible hydroxyl group-containing acrylic resin (A11') containing a gradient polymer layer; Hydroxyl group-containing acrylic resin (A1-2) | Hydroxyl group-containing acrylic resin (A1-1) | 40 | 40 | 40 | 40 | 40 | 40 | 40 |
| | Hydroxyl group-containing polyester resin (A2-1) | | | 25 | 25 | 25 | 25 | 25 | 25 | 25 |
| | Hydroxyl group-containing polyurethane resin (A3-1) | | | | | | | | | |
| Curing agent (B) | Amino resin (B1) | "CYMEL 325" | | 5 | 5 | 5 | 5 | 5 | 5 | 5 |
| | | "VPLS 2310" | | 15 | 15 | 15 | 15 | 15 | 15 | 15 |
| | Blocked polyisocyanate compound (B3) | Blocked polyisocyanate compound (B3-1) | | | | | | | | |
| Viscosity modifier (D) | Cellulose nanocrystal (D1) | "CellForce NCC" | | 3 | 3 | 2 | 1 | 2 | 2 | |
| | Cellulose nanofibers (D2) | "RHEOCRYSTA I-2SX" (Note 5) | | | | | | | | 1 |
| | "Primal ASE-60" (Note 6) | | | | | | | | 1 | |
| | "UH-752" (Note 7) | | | | | | | | | |
| Additional resin | Hydroxyl group-free polyurethane resin (U-1) | | | 10 | 10 | 10 | 10 | 10 | 10 | 10 |
| Content of water in coating composition [part by mass] | | | | 246 | 228 | 246 | 246 | 246 | 246 | 246 |
| Coating material solid content concentration [%] | | | | 25 | 25 | 25 | 25 | 25 | 25 | 25 |
| Content of organic solvent (E) having a solubility in water at 20° C. of 4 mass % or greater in coating composition [part by mass] | | | | 36 | 72 | 54 | 54 | 54 | 54 | 54 |
| Content of volatile component in coating composition [part by mass] | | | | 300 | 300 | 300 | 300 | 300 | 300 | 300 |
| Content proportion of organic solvent (E) having a solubility in water at 20° C. of 4 mass % or greater based on volatile component in coating composition [%] | | | | 12 | 24 | 18 | 18 | 18 | 18 | 18 |
| Evaluation | Metallic color irregularities under heating and curing condition at 80° C. | | | B | A | A | A | A | A | A |
| | Metallic color irregularities under heating and curing condition at 140° C. | | | B | A | A | A | A | A | A |
| | Storage stability | | | A | A | B | B | B | B | B |

| | | | | | Examples | | | | | |
|---|---|---|---|---|---|---|---|---|---|---|
| | | | | | | 20 | 21 | 22 | 23 | 24 | 25 |

| | | | | | 20 | 21 | 22 | 23 | 24 | 25 |
|---|---|---|---|---|---|---|---|---|---|---|
| Coating Composition No. | | | | | 20 | 21 | 22 | 23 | 24 | 25 |
| Scale-shaped effect pigment dispersion liquid | Pigment dispersion liquid name | | | | P-10 | P-11 | P-12 | P-13 | P-14 | P-15 |
| | Scale-shaped effect pigment (C) | Scale-shaped aluminum pigment (C1) | Silica-coated scale-shaped aluminum pigment (C11) | "Hydroran 2156" | 40 | 25 | 5 | | | |
| | | | | "Alpaste 6360NS" (Note 1) | | | | 15 | | |
| | | Scale-shaped light interference pigment (C2) | | "Xirallic T61-10 Micro Silver" (Note 2) | | | | | 15 | |
| | | | | "Iriodin 121 Rutile Lustre Satin" (Note 3) | | | | | | 15 |
| | Hydroxyl group-containing resin (A) | Hydroxyl group-containing acrylic resin (A1) | Acrylic resin (A1-3) having a hydroxyl group and a phosphate group | | 5 | 5 | 5 | 5 | 5 | 5 |
| | Organic solvent | Organic solvent (E) having a solubility in water at 20° C. of 4 mass % or greater | Organic solvent (E1) having a solubility in water at 20° C. of 4 to 10 mass % | Propylene glycol monobutyl ether / n-Butanol | 40 | 40 | 40 | 40 | 40 | 40 |
| | | | | Propylene glycol monomethyl ether | 8 | 8 | 8 | 8 | 8 | 8 |
| | | | | Ethylene glycol monobutyl ether | 3 | 3 | 3 | 3 | 3 | 3 |
| | | | | Dipropylene glycol monomethyl ether | 3 | 3 | 3 | 3 | 3 | 3 |
| | | Organic solvent having a solubility in water at 20° C. of less than 4 mass % | | Butyl acetate | | | | | | |
| | | | | 2-Ethyl-1-hexanol | | | | | | |
| | | | | Methyl isobutyl ketone | | | | | | |
| | | | | "Swasol 1000" (Note 4) | | | | | | |

TABLE 2-continued

| Category | | | | | | | | | | | |
|---|---|---|---|---|---|---|---|---|---|---|---|
| Hydroxyl group-containing resin (A) | Hydroxyl group-containing acrylic resin (A1) | Water-dispersible hydroxyl group-containing acrylic resin (A11) | Hydroxyl group-containing acrylic resin (A1-1) | | | 40 | 40 | 40 | 40 | 40 | 40 |
| | | | Water-dispersible hydroxyl group-containing acrylic resin (A11') containing a gradient polymer layer | Hydroxyl group-containing acrylic resin (A1-2) | | | | | | | |
| | | Hydroxyl group-containing polyester resin (A2-1) | | | | 25 | 25 | 25 | 25 | 25 | 25 |
| | | Hydroxyl group-containing polyurethane resin (A3-1) | | | | | | | | | |
| Curing agent (B) | Amino resin (B1) | "CYMEL 325" | | | | 5 | 5 | 5 | 5 | 5 | 5 |
| | Blocked polyisocyanate compound (B3) | "VPLS 2310" Blocked polyisocyanate compound (B3-1) | | | | 15 | 15 | 15 | 15 | 15 | 15 |
| Viscosity modifier (D) | Cellulose nanocrystal (D1) | "CellForce NCC" | | | | 3 | 3 | 3 | 3 | 3 | 3 |
| | Cellulose nanofibers (D2) | "RHEOCRYSTA I-2SX" (Note 5) | | | | | | | | | |
| | "Primal ASE-60" (Note 6) | | | | | | | | | | |
| | "UH-752" (Note 7) | | | | | | | | | | |
| Additional resin | Hydroxyl group-free polyurethane resin (U-1) | | | | | 10 | 10 | 10 | 10 | 10 | 10 |
| Content of water in coating composition [part by mass] | | | | | | 246 | 246 | 246 | 246 | 246 | 246 |
| Coating material solid content concentration [%] | | | | | | 25 | 25 | 25 | 25 | 25 | 25 |
| Content of organic solvent (E) having a solubility in water at 20° C. of 4 mass % or greater in coating composition [part by mass] | | | | | | 54 | 54 | 54 | 54 | 54 | 54 |
| Content of volatile component in coating composition [part by mass] | | | | | | 300 | 300 | 300 | 300 | 300 | 300 |
| Content proportion of organic solvent (E) having a solubility in water at 20° C. of 4 mass % or greater based on volatile component in coating composition [%] | | | | | | 18 | 18 | 18 | 18 | 18 | 18 |
| Evaluation | Metallic color irregularities under heating and curing condition at 80° C. | | | | | A | A | B | A | B | B |
| | Metallic color irregularities under heating and curing condition at 140° C. | | | | | A | A | B | A | B | B |
| | Storage stability | | | | | B | A | A | B | A | A |

| | | | | | Comparative Examples | | | | | | | |
|---|---|---|---|---|---|---|---|---|---|---|---|---|
| | | | | | 1 | 2 | 3 | 4 | 5 | 6 | 7 | 8 |
| Coating Composition No. | | | | | 26 | 27 | 28 | 29 | 30 | 31 | 32 | 33 |
| Scale-shaped effect pigment dispersion liquid | Scale-shaped effect pigment (C) | Scale-shaped aluminum pigment (C1) | Silica-coated scale-shaped aluminum pigment (C11) | "Hydroran 2156" | 15 | 15 | 15 | 15 | 15 | 15 | 15 | 15 |
| | | | "Alpaste 6360NS" (Note 1) | | | | | | | | | |
| | | Scale-shaped light interference pigment (C2) | "Xirallic T61-10 Micro Silver" (Note 2) | | | | | | | | | |
| | | | "Iriodin 121 Rutile Lustre Satin" (Note 3) | | | | | | | | | |
| | Hydroxyl group-containing resin (A) | Hydroxyl group-containing acrylic resin (A1) | Acrylic resin (A1-3) having a hydroxyl group and a phosphate group | | 5 | 5 | 5 | 5 | 5 | 5 | 5 | 5 |
| | | | Pigment dispersion liquid name | | P-16 | P-17 | P-18 | P-19 | P-20 | P-21 | P-1 | P-1 |

TABLE 2-continued

| | | | | | | | | | | | | |
|---|---|---|---|---|---|---|---|---|---|---|---|---|
| Organic solvent | Organic solvent (E) having a solubility in water at 20° C. of 4 mass % or greater | Organic solvent (E1) having a solubility in water at 20° C. of 4 to 10 mass % | Propylene glycol monobutyl ether | 13 | 13 | 13 | 13 | | 70 | 40 | 40 |
| | | | n-Butanol | | | | | | | | |
| | | | Propylene glycol monomethyl ether | 8 | 8 | 8 | 8 | | 8 | 8 | 8 |
| | | | Ethylene glycol monobutyl ether | 3 | 3 | 3 | 3 | | 3 | 3 | 3 |
| | | | Dipropylene glycol monomethyl ether | 3 | 3 | 3 | 3 | | 3 | 3 | 3 |
| | | Organic solvent having a solubility in water at 20° C. of less than 4 mass % | Butyl acetate | 27 | | | | 18 | | | |
| | | | 2-Ethyl-1-hexanol | | 27 | | | 18 | | | |
| | | | Methyl isobutyl ketone | | | 27 | | 18 | | | |
| | | | "Swasol 1000" (Note 4) | | | | 27 | | | | |
| Hydroxyl group-containing resin (A) | Hydroxyl group-containing acrylic resin (A1) | Water-dispersible hydroxyl group-containing acrylic resin (A11) | Hydroxyl group-containing acrylic resin (A1-1) | 40 | 40 | 40 | 40 | 40 | 40 | 40 | 40 |
| | | | Water-dispersible hydroxyl group-containing acrylic resin (A11') containing a gradient polymer layer / Hydroxyl group-containing acrylic resin (A1-2) | | | | | | | | |
| | Hydroxyl group-containing polyester resin (A2-1) | | | 25 | 25 | 25 | 25 | 25 | 25 | 25 | 25 |
| | Hydroxyl group-containing polyurethane resin (A3-1) | | | | | | | | | | |
| Curing agent (B) | Amino resin (B1) | "CYMEL 325" | | 5 | 5 | 5 | 5 | 5 | 5 | 5 | 5 |
| | Blocked polyisocyanate compound (B3) | 15 Blocked polyisocyanate compound (B3-1) | | 15 | 15 | 15 | 15 | 15 | 15 | 15 | |
| Viscosity modifier (D) | Cellulose nanocrystal (D1) | "CellForce NCC" | | 3 | 3 | 13 | 3 | 3 | 3 | | |
| | Cellulose nanofibers (D2) | "RHEOCRYSTA I-2SX" (Note 5) | | | | | | | | | |
| | "Primal ASE-60" (Note 6) | | | | | | | | | 3 | |
| | "UH-752" (Note 7) | | | | | | | | | | 3 |
| Additional resin | Hydroxyl group-free polyurethane resin (U-1) | | | 10 | 10 | 10 | 10 | 10 | 10 | 10 | 10 |
| Content of water in coating composition [part by mass] | | | | 246 | 246 | 246 | 246 | 246 | 216 | 246 | 246 |
| Coating material solid content concentration [%] | | | | 25 | 25 | 25 | 25 | 25 | 25 | 25 | 25 |
| Content of organic solvent (E) having a solubility in water at 20° C. of 4 mass % or greater in coating composition [part by mass] | | | | 27 | 27 | 27 | 27 | 0 | 84 | 54 | 54 |
| Content of volatile component in coating composition [part by mass] | | | | 300 | 300 | 300 | 300 | 300 | 300 | 300 | 300 |
| Content proportion of organic solvent (E) having a solubility in water at 20° C. of 4 mass % of greater based on volatile component in coating composition [%] | | | | 9 | 9 | 9 | 9 | 0 | 28 | 18 | 18 |
| Evaluation | Metallic color irregularities under heating and curing condition at 80° C. | | | C | D | C | C | D | C | A | A |
| | Metallic color irregularities under heating and curing condition at 140° C. | | | C | D | C | C | D | C | A | A |
| | Storage stability | | | A | A | A | A | A | A | C | D |

The invention claimed is:

1. A coating composition comprising:
a hydroxyl group-containing resin (A);
a curing agent (B);
a scale-shaped effect pigment (C);
a viscosity modifier (D); and
an organic solvent (E) having a solubility in water at 20° C. of 4 mass % or greater,
wherein the viscosity modifier (D) contains at least one viscosity modifier selected from the group consisting of a cellulose nanocrystal (D1) and a cellulose nanofiber (D2),
wherein the organic solvent (E) includes one or more solvents selected from the group consisting of propylene glycol monobutyl ether, n-butanol, propylene glycol monomethyl ether, ethylene glycol monobutyl ether, and dipropylene glycol monomethyl ether, and wherein a content of the organic solvent (E) having a solubility in water at 20° C. of 4 mass % or greater is in a range from 10 to 25 mass % based on a total content of all volatile components in the coating composition.

2. The coating composition according to claim 1, wherein the scale-shaped effect pigment (C) contains a silica-coated scale-shaped aluminum pigment (C11).

3. The coating composition according to claim 1, wherein the viscosity modifier (D) contains the cellulose nanocrystal (D1).

4. The coating composition according to claim 1, wherein the organic solvent (E) having a solubility in water at 20° C. of 4 mass % or greater contains an organic solvent (E1) having a solubility in water at 20° C. in a range from 4 to 10 mass %.

5. The coating composition according to claim 1, further comprising water.

6. A method for forming a multilayer coating film, the method comprising:

(I-1) applying a basecoat coating composition (Y) onto an object to be coated to form an uncured basecoat film;

(I-2) applying a clearcoat coating composition (Z) onto the uncured basecoat film to form an uncured clearcoat film; and (I-3) heating the uncured basecoat film and the uncured clearcoat film to simultaneously cure the uncured basecoat film and the uncured clearcoat film, wherein the basecoat coating composition (Y) is the coating composition according to claim 1.

7. A method for forming a multilayer coating film, the method comprising:

(II-1) applying a colored coating composition (X) onto an object to be coated to form an uncured colored coating film;

(II-2) applying a basecoat coating composition (Y) onto the uncured colored coating film to form an uncured basecoat film;

(II-3) applying a clearcoat coating composition (Z) onto the uncured basecoat film to form an uncured clearcoat film; and (II-4) heating the uncured colored coating film, the uncured basecoat film, and the uncured clearcoat film to simultaneously cure the uncured colored coating film, the uncured basecoat film, and the uncured clearcoat film, wherein the basecoat coating composition (Y) is the coating composition according to claim 1.

* * * * *